US007801129B2

(12) United States Patent
Batteram et al.

(10) Patent No.: US 7,801,129 B2
(45) Date of Patent: Sep. 21, 2010

(54) METHOD AND APPARATUS FOR SIP MESSAGE PRIORITIZATION

(75) Inventors: Harold Batteram, Kortenhoef (NL);
Hendrik B. Meeuwissen, Huizen (NL);
Jeroen van Bemmel, Leiden (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 911 days.

(21) Appl. No.: 11/412,436

(22) Filed: Apr. 27, 2006

(65) Prior Publication Data
US 2007/0253412 A1 Nov. 1, 2007

(51) Int. Cl.
*H04L 12/56* (2006.01)
(52) U.S. Cl. ........................ 370/389; 370/392
(58) Field of Classification Search ......... 370/389–392, 370/412
See application file for complete search history.

(56) References Cited

U.S. PATENT DOCUMENTS

| 6,988,133 | B1 |   | 1/2006 | Zavalkovsky et al. |         |
|-----------|----|---|--------|--------------------|---------|
| 7,170,863 | B1 | * | 1/2007 | Denman et al.      | 370/260 |
| 7,412,529 | B2 | * | 8/2008 | Ryu                | 709/230 |
| 2004/0133683 | A1 | * | 7/2004 | Keller et al.   | 709/227 |
| 2004/0156380 | A1 |   | 8/2004 | Silverman et al.  |         |
| 2004/0165587 | A1 | * | 8/2004 | Kiyoto et al.    | 370/389 |
| 2005/0070230 | A1 | * | 3/2005 | Das et al.       | 455/69  |
| 2005/0105464 | A1 | * | 5/2005 | Acharya et al.   | 370/229 |
| 2005/0157646 | A1 | * | 7/2005 | Addagatla et al. | 370/232 |
| 2005/0163126 | A1 | * | 7/2005 | Bugenhagen et al. | 370/395.2 |
| 2006/0050683 | A1 |   | 3/2006 | Wall et al.       |         |
| 2007/0206620 | A1 | * | 9/2007 | Cortes et al.    | 370/412 |

FOREIGN PATENT DOCUMENTS

WO        WO 01/67674 A        9/2001

OTHER PUBLICATIONS

Schulzrinne Columbia University H: "Requirements for Resource Priority Mechanisms for the Session Initiation Protocol (SIP); rfc3487.txt;" IETF Standard, Internet Engineering Task Force, IETF, CH, Feb. 2003, pp. 1-17, XP015009270 ISSN: 0000-0003.
Schulzrinne Columbia U J Polk Cisco Systems H: "Communications Resource Priority for the Session Initiation Protocol (SIP); rfc4412. txt" IETF Standard, Internet Engineering Task Force, IETF, CH, Feb. 2006, pp. 1-36, XP015044832 ISSN: 0000-0003.

(Continued)

*Primary Examiner*—Pankaj Kumar
*Assistant Examiner*—Saba Tsegaye
(74) *Attorney, Agent, or Firm*—Wall & Tong, LLP

(57) ABSTRACT

The invention includes a method and apparatus for providing SIP message prioritization between network elements along at least a portion of an end-to-end path between a SIP client and a SIP server. The method includes determining a SIP message prioritization policy and distributing the SIP message prioritization policy toward a prioritizing network element adapted to assign message priority levels to respective received SIP messages using the SIP message prioritization policy, process the received SIP messages according to the respective assigned message priority levels, and transmit the prioritized SIP messages toward at least one network element in a manner for propagating the respective assigned message priority levels to the at least one network element. The prioritizing network elements include SIP network elements and non-SIP network elements.

10 Claims, 7 Drawing Sheets

OTHER PUBLICATIONS

Olaussen E et al: "A policy-based priority and precedence framework for military IP networks" Military Communications Conference, 2004. MILICOM 2004. 2004 IEEE Monterey, CA, USA Oct. 31-Nov. 3, 2004, Piscataway, NJ, pp. 827-833, XP010825755 ISBN: 0-7803-8847-x.

Yavatkar R et al: "RFC 2753 A Framework for Policy-based Admission Control" Internet Citation, [Online] Jan. 2000 92000-01), pp. 1-20, XP002179102 Retrieved from the Internet: URL:http://www.ietf.org/rfc/rfc2753.txt?number=2753. [Retrieved on Oct. 2, 2001].

* cited by examiner

METHOD AND APPARATUS FOR SIP MESSAGE PRIORITIZATION

FIELD OF THE INVENTION

The invention relates to the field of communication networks and, more specifically, to Session Initiation Protocol based communication networks.

BACKGROUND OF THE INVENTION

The Internet Protocol (IP) Multimedia Subsystem (IMS) architecture is evolving as the service infrastructure for IP networks. The IMS architecture supports services such as voice-over-IP (VoIP), multimedia sessions, presence, instant messaging, gaming, and various other services. The Session Initiation Protocol (SIP) is an important part of the IMS architecture. In support of such services, SIP messages are routed between SIP network elements (including SIP end user equipment) according to the SIP protocol as defined in RFC3261, RFC3263, and associated extension documents. In a SIP network, equipment that initiates a SIP message is referred to as a SIP client (e.g., SIP User Agent Client) and the equipment that terminates a SIP message is referred to as a SIP server (e.g., SIP User Agent Server).

The SIP messages transmitted between SIP clients and SIP servers traverse SIP network elements supporting various functions. For example, SIP message transmitted between SIP UACs and SIP UASs may traverse SIP proxy servers that determine the next SIP element in the routing path, SIP registrars that register SIP device locations in databases, SIP application servers that perform application specific operations based on SIP message content, and various other SIP network elements. Since the IMS architecture supports a variety of different services, SIP messages may differ in their importance or urgency (e.g., the set of SIP messages required for establishing an E-911 emergency call may have a higher importance and urgency than respective sets of SIP messages required for establishing standard VoIP calls).

In general, the number of SIP messages in a SIP network element represents the load of the SIP network element. A high-load condition occurs if a SIP network element receives more messages than it is capable of processing. Several measures are available to deal with high-load conditions. For example, SIP network element hardware equipment may be upgraded, or load distribution strategies may be applied in order to divide SIP messages across several SIP network elements. Disadvantageously, however, despite careful network engineering, SIP network elements may experience high-load and overload conditions, thereby resulting in SIP message delays and drops independent of the importance or urgency of the SIP messages.

SUMMARY OF THE INVENTION

Various deficiencies in the prior art are addressed through the invention of a method and apparatus for providing SIP message prioritization between network elements along at least a portion of an end-to-end path between a SIP client and a SIP server. The method includes determining a SIP message prioritization policy and distributing the SIP message prioritization policy toward a prioritizing network element adapted to assign message priority levels to respective received SIP messages using the SIP message prioritization policy, process the received SIP messages according to the respective assigned message priority levels, and transmit the prioritized SIP messages toward at least one network element in a manner for propagating the respective assigned message priority levels to the at least one network element. The prioritizing network elements include SIP network elements and non-SIP network elements.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides prioritization of SIP messages on at least a portion of an end-to-end path (i.e., across SIP network elements). The prioritization of SIP messages across SIP network elements may be performed using a prioritization policy determined and distributed to the SIP network elements by a management system. The prioritization policy may be determined based on information from network (including feedback from prioritizing SIP network elements utilizing the prioritization policy). The message priority levels assigned according to the prioritization policy may be used to process the prioritized SIP messages to perform various functions, including selecting output networks, selecting quality of service parameters, selecting next SIP network elements, processing SIP messages within SIP network elements according to the message priority levels, and the like, as well as various combinations thereof. The prioritizing SIP network elements may propagate (convey) message priority levels between network elements.

The present invention provides prioritization of SIP messages within a prioritizing SIP network element. A prioritizing SIP network element includes a first SIP message parsing and prioritization stage in which a portion of each SIP message is parsed in order to determine and assign an associated message priority level. The prioritization of SIP messages (i.e., determining the message priority level assigned to each SIP message) may be performed using a SIP message prioritization policy. The assignment of the determined message priority level may be performed using at least one of a plurality of message priority level assignment methods. A prioritizing SIP network element includes a second SIP message parsing and processing stage in which remaining portions of each SIP message (e.g., portions not parsed by the first stage) are parsed and processed in order to process the message (e.g., route the SIP message, perform an application-specific function in response to the SIP message, and the like). The processing of prioritized SIP messages is performed using respective assigned message priority levels.

Figure 1A:
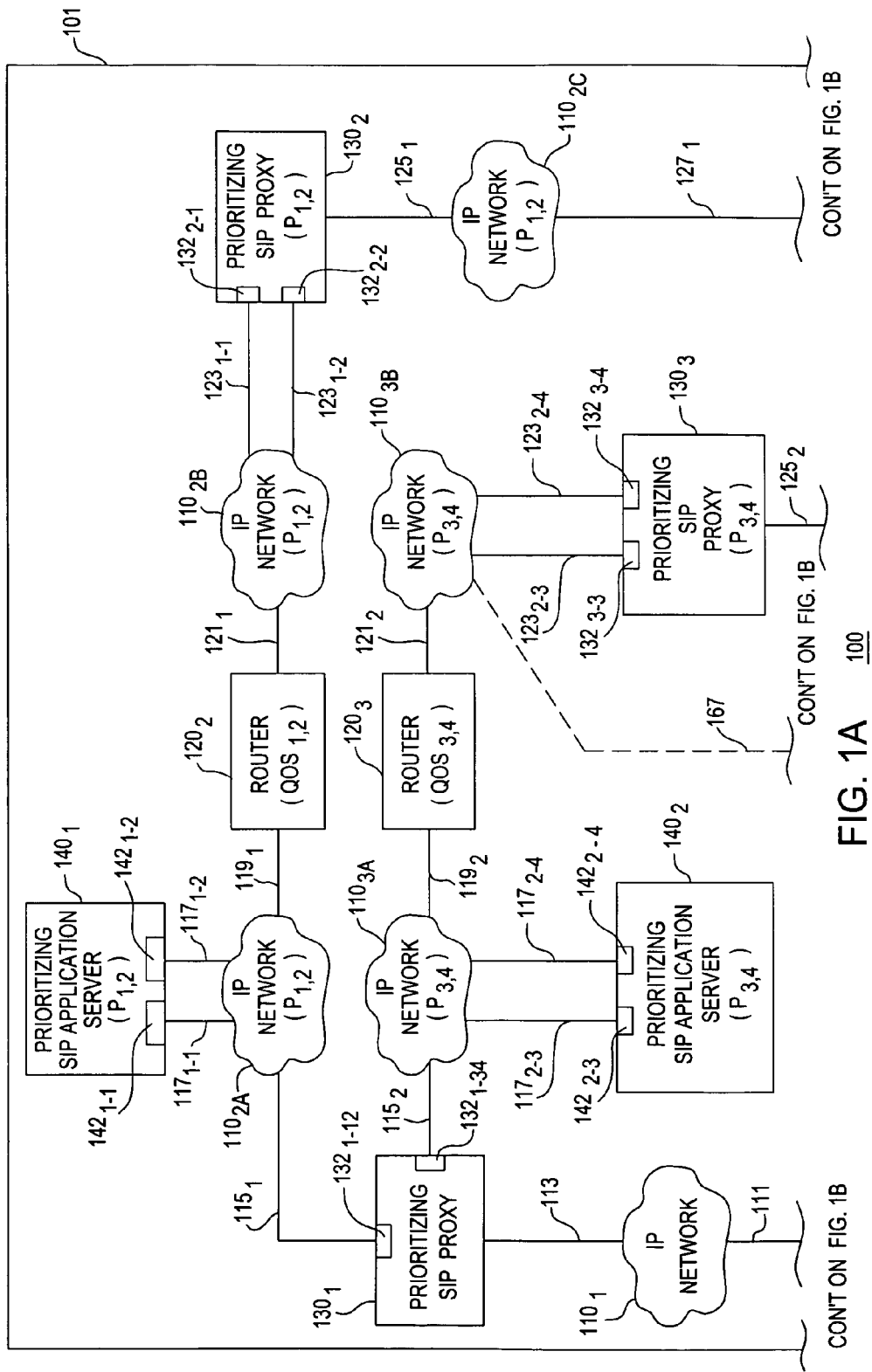
FIG. 1 depicts a high-level block diagram of a communication network.
Figure 1B:
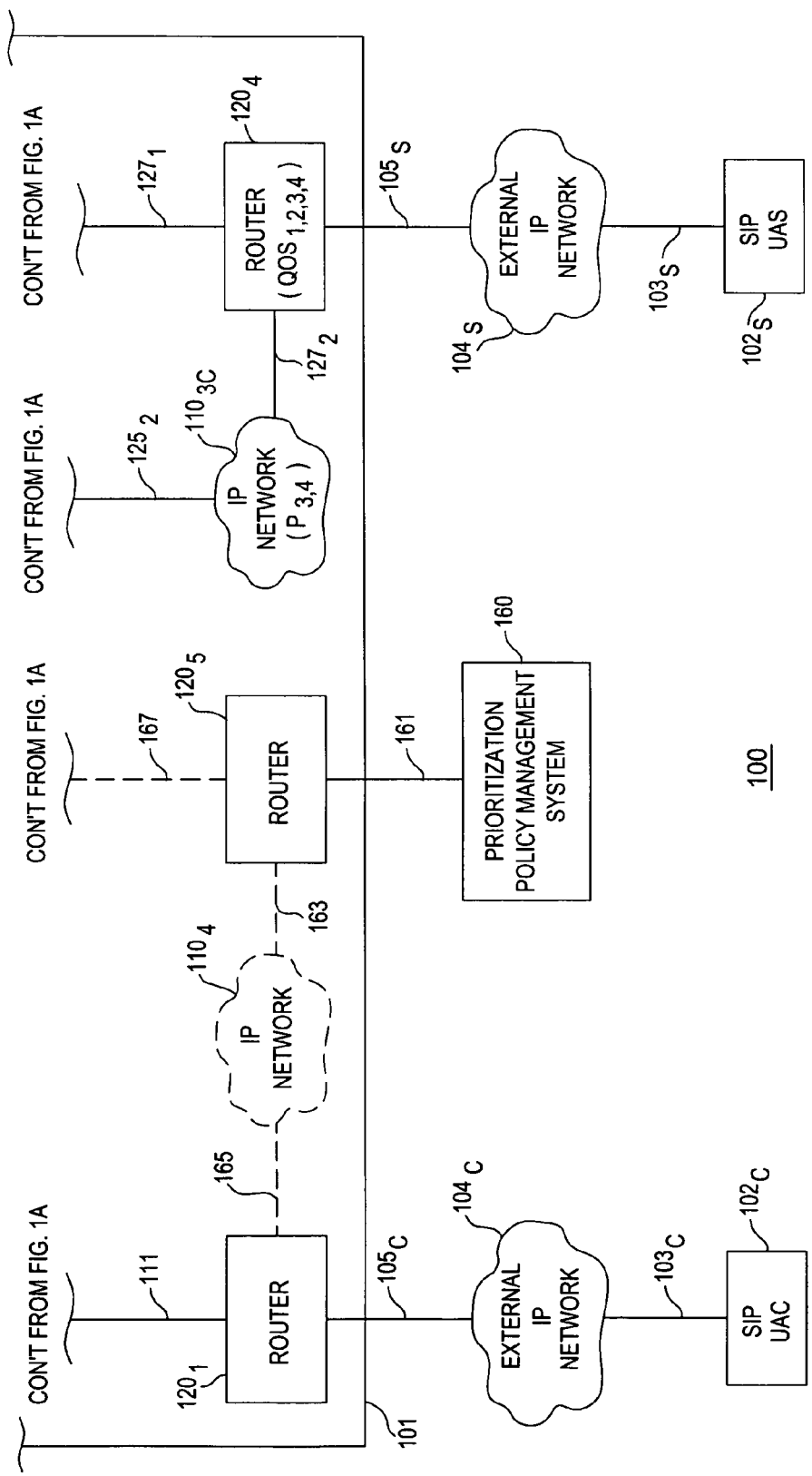

FIG. 1 depicts a high-level block diagram of a communication network. Specifically, communication network 100 includes a pair of SIP user agents (UAs), illustratively, a client SIP UA $102_C$ (denoted as SIP UAC $102_C$) and a server SIP UA $102_S$ (denoted as SIP UAS $102_S$) in communication using a respective pair of external IP networks $104_C$ and $104_S$ (collectively, external IP networks 104) and a service provider domain 101. As depicted in FIG. 1, external IP networks 104 access service provider domain 101 using a respective pair of routers. As depicted in FIG. 1, communication network 100 includes a prioritization policy management system (PPMS) 160 adapted for determining, applying, and controlling prioritization policies within service provider domain 101. The communication network 100 uses SIP signaling to support services such as voice-over-IP sessions, multimedia sessions, presence, instant messaging, gaming, and the like.

As depicted in FIG. 1, service provider domain 101 includes a plurality of IP networks $110_1$, $110_{2A}$-$110_{2C}$ (collectively, IP networks $110_2$), $110_{3A}$-$110_{3C}$, (collectively, IP networks $110_3$), and $110_4$. The IP networks $110_1$-$110_4$ may be collectively referred to herein as IP networks 110. As depicted in FIG. 1, IP networks 110 include packet networks operable for transporting messages having varying message priority levels. In one embodiment, at least a portion of IP networks 110 may be adapted to support prioritized SIP messages (illustratively, IP networks $110_2$ and $110_3$ support prioritized SIP messages). As depicted in FIG. 1, IP networks $110_2$ support priority level one (denoted as $P_1$) and priority level two (denoted as $P_2$) and IP networks $110_3$ support priority level three (denoted as $P_3$) and priority level four (denoted as $P_4$).

As depicted in FIG. 1, service provider domain 101 includes a plurality of routers $120_1$-$120_4$ (collectively, routers 120). The routers 120 include network elements operable for routing messages between network components. The routers 120 are adapted for processing messages having varying message priority levels. In one embodiment, at least a portion of routers 120 may be adapted to support prioritized SIP messages. In one embodiment, at least a portion of routers 120 may be adapted to apply QOS parameters to prioritized SIP messages according to message priority level. As depicted in FIG. 1, router $120_2$ supports priority levels one and two ($P_1$ and $P_2$), router $120_3$ supports priority levels three and four ($P_3$ and $P_4$), and router $120_4$ supports priority levels one, two, three, and four ($P_1$, $P_2$, $P_3$, and $P_4$).

As depicted in FIG. 1, service provider domain 101 includes a plurality of prioritizing SIP proxies (PSPs) $130_1$-$130_3$ (collectively, PSPs 130). The PSPs 130 include network elements operable for determining the next SIP network element in the SIP message routing path. The PSPs 130 are adapted for processing messages having varying message priority levels. In one embodiment, at least a portion of PSPs 130 may be adapted to perform initial prioritization of SIP messages to one of a plurality of message priority levels, reprioritization of SIP messages from one message priority level to another message priority level, and like message prioritization functions. As depicted in FIG. 1, PSP $130_1$ supports priority levels one, two, three, and four ($P_1$, $P_2$, $P_3$, and $P_4$), PSP $130_2$ supports priority levels one and two ($P_1$ and $P_2$), and PSP $130_3$ supports priority levels three and four ($P_3$ and $P_4$).

As depicted in FIG. 1, service provider domain 101 includes a plurality of prioritizing SIP application servers (PSASs) $140_1$-$140_2$ (collectively, PSASs 140). The routers 120 include network elements operable for performing various application specific operations based on SIP message content. The PSASs 140 include network elements operable for processing messages having varying message priority levels. In one embodiment, at least a portion of PSASs 130 may be adapted to perform initial prioritization of SIP messages to one of a plurality of message priority levels, reprioritization of SIP messages from one message priority level to another message priority level, and like message prioritization functions. As depicted in FIG. 1, PSAS $140_1$ supports priority levels one and two ($P_1$ and $P_2$), and PSAS $140_2$ supports priority levels three and four ($P_3$ and $P_4$).

The SIP UAC $102_C$ and external IP network $104_C$ communicate using a link $103_C$. The external IP network $104_C$ and router $120_1$ communicate using a link $105_C$. The SIP UAS $102_S$ and external IP network $104_S$ communicate using a link $103_S$. The external IP network $104_S$ and router $120_4$ communicate using a link $105_S$. The router $120_1$ and IP network $110_1$ communicate using a link 111. The IP network $110_1$ and PSP $130_1$ communicate using a link 113. The PSP $130_1$ communicates with router $120_4$ using one of a pair of communication paths adapted for transporting SIP messages having different message priority levels (illustratively, one path supports SIP messages having priority levels one and two and the other path supports SIP messages having priority levels three and four).

With respect to the path supporting SIP messages having priority levels one and two, PSP $130_1$ communicates, from an associated port $132_{1-12}$, with IP network $110_{2A}$ using a link $115_1$. The IP network $110_{2A}$ communicates with ports $142_{1-1}$ (for SIP messages having priority level one) and $142_{1-2}$ (for SIP messages having priority level two) of PSAS $140_1$ using links $117_{1-1}$ and $117_{1-2}$, respectively. The IP network $110_{2A}$ communicates with router $120_2$ using a link $119_1$. The router $120_2$ communicates with IP network $110_{2B}$ using a link $121_1$. The IP network $110_{2B}$ communicates with ports $132_{2-1}$ (for SIP messages having priority level one) and $132_{2-2}$ (for SIP messages having priority level two) of PSP $130_2$ using links $123_{1-1}$ and $123_{1-2}$, respectively. The PSP $130_2$ communicates with IP network $110_{2C}$ using link $125_1$. The IP network $110_{2C}$ communicates with router $120_4$ using link $127_1$.

With respect to the path supporting SIP messages having priority levels three and four, PSP $130_1$ communicates, from an associated port $132_{1-34}$, with IP network $110_{3A}$ using a link $115_2$. The IP network $110_{3A}$ communicates with ports $142_{2-3}$ (for SIP messages having priority level three) and $142_{2-4}$ (for SIP messages having priority level four) of PSAS $140_2$ using links $117_{2-3}$ and $117_{2-4}$, respectively. The IP network $110_{3A}$ communicates with router $120_3$ using a link $119_2$. The router $120_3$ communicates with IP network $110_{3B}$ using a link $121_2$. The IP network $110_{3B}$ communicates with ports $132_{3-3}$ (for SIP messages having priority level three) and $132_{3-4}$ (for SIP messages having priority level four) of PSP $130_3$ using links $123_{2-3}$ and $123_{2-4}$, respectively. The PSP $130_3$ communicates with IP network $110_{3C}$ using link $125_2$. The IP network $110_{3C}$ communicates with router $120_4$ using link $127_2$.

As depicted in FIG. 1, PSPs 130 and PSASs 140 operate as prioritizing SIP network elements, and routers $120_2$, $120_3$ and $120_4$ operate as prioritizing non-SIP network elements. The prioritizing SIP network elements and prioritizing non-SIP network elements may be collectively referred to as prioritizing network elements. The remaining network components depicted and described with respect to FIG. 1 (e.g., SIP UAC $102_C$, router $120_1$, SIP UAS $102_S$, and the like) operate as non-prioritizing network components, including both non-prioritizing SIP network elements and non-prioritizing non-SIP network elements.

As depicted in FIG. 1, PPMS 160 determines message prioritization policies adapted for supporting message prioritization along at least a portion of an end-to-end communication path. The PPMS 160 determines SIP message prioritization policies adapted for coordinating SIP message prioritization across various network components of a service provider domain (illustratively, routers 120$_2$ and 120$_3$, PSPs 130, and PSASs 140 of service provider domain 101). The PPMS 160 determines SIP message prioritization policies adapted for supporting multiple message priority levels. In one embodiment, SIP message prioritization policies may be determined and generated manually by one or more operators using PPMS 160. In one embodiment, SIP message prioritization policies may be determined and generated automatically by PPMS 160. Although depicted as a standalone system, in one embodiment, at least a portion of the functions depicted and described herein with respect to PPMS 160 may be co-located with one or more network elements.

As described herein, PPMS 160 may determine and generate SIP message prioritization policies using various combinations of information. In one embodiment, PPMS 160 may determine and generate SIP message prioritization policies using information obtained from other management systems (e.g., information associated with scheduled events which may result in changes in network traffic patterns, network traffic volumes, and the like, as well as various combinations thereof). In one embodiment, PPMS 160 may determine and generate SIP message prioritization policies using information obtained from the network, such as monitored and measured network traffic message characteristics, network traffic load conditions, and the like, as well as various combinations thereof. In one embodiment, PPMS 160 may determine and generate SIP message prioritization policies using various combinations of other information described herein.

The PPMS 160 distributes SIP message prioritization policies to network elements in service provider domain 101. As depicted in FIG. 1, PPMS 160 distributes SIP message prioritization policies to routers 120$_2$ and 120$_3$, PSPs 130, and PSASs 140 to configure routers 120$_2$ and 120$_3$, PSPs 130, and PSASs 140 to support varying SIP message priority levels. As depicted in FIG. 1, PPMS 160 distributes at least one prioritization policy to each of PSP 130$_1$, PSAS 140$_1$, router 120$_2$, PSP 130$_2$, and router 120$_4$ for supporting SIP messages having priority levels one and two. As depicted in FIG. 1, PPMS 160 distributes at least one prioritization policy to each of PSP 130$_1$, PSAS 140$_2$, router 120$_3$, PSP 130$_3$, and router 120$_4$ for supporting SIP messages having priority levels three and four. The routers 120$_2$ and 120$_3$, PSPs 130, and PSASs 140 use the SIP message prioritization policies to assign message priority levels to SIP messages for use in processing the prioritized SIP messages.

As depicted in FIG. 1, PPMS 160 communicates with various network components of service provider domain 101 using router 120$_5$. The PPMS 160 communicates with service provider domain 101 using a link 161. Although not specifically depicted, router 120$_5$ may communicate, directly or indirectly, with various combinations of network components of service provider domain 101. For example, in one embodiment, router 120$_5$ may communicate with router 120$_1$ using IP network 110$_4$ and associated links 163 and 165. For example, in one embodiment, router 120$_5$ may communicate with IP network 110$_{3B}$ using a link 167. Although not depicted, in an embodiment in which prioritization functionality described with respect to PPMS 160 is implemented as a portion of one or more network components of service provider domain 101, communications associated with such prioritization functionality may be conveyed by the network components of service provider domain 101.

In one embodiment, initial determination of a message priority level for a SIP message may be performed by one of a plurality of SIP components along the end-to-end path between SIP UAC and SIP UAS (e.g., SIP UAC, SIP proxy servers, SIP application servers, and the like). As depicted in FIG. 1, PSP 130$_1$ performs the initial determination and assignment of a message priority level to each SIP message initiated by SIP UAC 102$_C$ that is intended for SIP UAS 102$_S$. In one embodiment, a message priority level initially determined and assigned to a SIP message may be modified by one or more of a plurality of SIP components between the SIP component which initially determined and assigned the message priority level and the SIP UAS (e.g., SIP proxy servers, SIP application servers, and the like).

In one embodiment, determination of a message priority level of a SIP message (either initial determination or subsequent determination) may be performed using one or more SIP message prioritization policies. In one such embodiment, determination of a message priority level of a SIP message may be based on one or more SIP message prioritization factors associated with the one or more SIP message prioritization policies (e.g., factors used by the SIP message prioritization policy to determine message priority levels of SIP messages). As such, since, in one embodiment, similar processing may be performed for determining an initial message priority level of a SIP message or determining a subsequent message priority level of a SIP message, unless otherwise noted, any function/capability/means/method described herein with respect to determining a message priority level may be utilized for initially or subsequently (if a message priority level was assigned by another prioritizing SIP network element) determining a message priority level of a SIP message.

In one embodiment, the message priority level of the SIP message is determined using the SIP message prioritization policy and the at least one parameter. In one embodiment, in response to a determination that a message priority level of SIP message was not previously assigned to the SIP message, a portion of a SIP message header of the received SIP message may be parsed in order to identify the at least one parameter adapted for use in determining the message priority level. In one embodiment, in response to a determination that the message priority level of SIP message was previously assigned to the SIP message, a portion of a SIP message header of the received SIP message may be parsed in order to determine the previously assigned message priority level of the SIP message. In one such embodiment, the previously assigned message priority level may constitute one of the identified parameters used in conjunction with a SIP message prioritization policy to determine and assign the message priority level to the SIP message.

In one embodiment, a message priority level of a SIP message may be determined based on at least one of at least one SIP message characteristic (e.g., SIP message type, SIP message size, and the like, as well as various combinations thereof), at least one SIP message header field (including respective SIP message header field names and SIP message header field values), SIP message content, and the like, as well as various combinations thereof. In one embodiment, a message priority level may be assigned or modified based on the transaction type (e.g., the SIP dialog or transaction to which the SIP message belongs). In one embodiment, a message priority level of a SIP message may be determined based on traffic measurements (e.g., network and network element traffic load measurements, and the like, as well as various combinations thereof). In one embodiment, a message priority level of a SIP message may be determined based on time (e.g., day of year, day of week, time of day, and the like) as well as various combinations thereof.

In one embodiment, a message priority level of a SIP message may be determined based on at least one network transport layer characteristic (e.g., IP source address, IP destination address, port number, transport protocol type (e.g., Transmission Control Protocol (TCP), User Datagram Protocol (UDP), and the like), and the like, as well as various combinations thereof). In one embodiment, a message priority level of a SIP message may be determined based on at least one network data link layer characteristic (e.g., retransmission counters). Although described with respect to network transport and data link layer characteristics, in one embodiment, a message priority level of a SIP message may be determined based on various other network characteristics, protocol characteristics, and the like, as well as various combinations thereof.

As depicted in FIG. 1, each SIP message received by PSP $130_1$ from SIP UAC $102_C$ is assigned a message priority level (e.g., including message priority levels one ($P_1$), two ($P_2$), three ($P_3$), and four ($P_4$)), where $P_1 > P_2 > P_3 > P_4$. In one embodiment, in which the received SIP message does not have an associated message priority level, PSP $130_1$ processes the SIP message for determining and assigning a message priority level. The processing of received SIP messages for determining, assigning, and utilizing (internally) a message priority level is depicted and described herein with respect to FIG. 3-FIG. 4. In one embodiment, in which the message priority level of a received SIP message was previously established (e.g., established at SIP UAC $102_C$ upon formation of the SIP message), PSP $130_1$ processes the prioritized SIP message for determining the previously assigned message priority level.

The prioritizing SIP network element which assigns message priority levels to respective SIP messages assigns message priority levels in a manner for enabling propagation of message priority levels to other prioritizing SIP network elements. In one embodiment, message priority levels may be propagated between network elements in a manner preventing other prioritizing SIP network elements from having to re-determine the message priority levels in the manner required by the initial SIP network element which assigned respective message priority levels (e.g., the SIP message prioritization policy may indicate that the previously assigned message priority level be retained). The propagation of message priority levels to other prioritizing network elements (prioritizing SIP network elements, prioritizing non-SIP network elements, and the like, as well as various combinations thereof) associated with the end-to-end path between SIP UAC and SIP UAS may be performed using various message priority level propagation schemes.

In one embodiment, message priority levels may be propagated by mapping the port on which the SIP message is received to a message priority level. In one embodiment, message priority levels may be propagated by modifying a portion of an existing message header to convey the message priority level. In one embodiment, message priority levels may be propagated by adding a new message header to convey the message priority level (e.g., the Resource-Priority header). In one embodiment, message priority levels may be propagated by mapping respective portions of IP headers of IP messages (e.g., TOS bytes of respective IP message headers) transporting a SIP message to an associated message priority level. In one embodiment, message priority levels may be propagated by using different SIP network elements, including prioritizing SIP network elements and non-prioritizing SIP network elements, for different message priority levels, and the like.

The processing of a prioritized SIP message to determine a previously assigned message priority level associated with the SIP message may be performed in various manners. In one embodiment, the message priority level of a SIP message may be determined using at least one header field (e.g., a SIP header field, an IP header field, an additional header field, and the like). In one embodiment, the message priority level may be determined based on the network component from which the SIP message is received (e.g., from a network, from a network element, and the like). In one embodiment, the message priority level may be determined based on the port on which the SIP message is received. Although described with respect to PSP $130_1$, each prioritizing network component of service provider domain 101 may perform such processing, either based on other network elements or independent of other network elements, in order to determine the message priority level of a prioritized SIP message.

In one embodiment, prioritized SIP messages may be processed in a message processing order determined according to the respective message priority levels. In one embodiment, prioritized SIP message may be processed using the respective message priority levels. In one embodiment, processing of prioritized SIP messages using respective message priority levels of the SIP messages may be performed using one or more prioritization policies (e.g., prioritization policies distributed by PPMS 160). The processing of prioritized SIP messages using respective message priority levels of the SIP messages may vary across network components (e.g., processing of SIP messages by prioritizing SIP proxies and prioritizing SIP application servers is different).

In one embodiment, prioritizing SIP network elements (e.g., PSPs, routers, PSASs, and the like) may process prioritized SIP messages for determining routing of the prioritized SIP messages. In one embodiment, prioritizing SIP network elements may process prioritized SIP messages for selecting a next prioritizing SIP network element to which each prioritized SIP message is transmitted. In one embodiment, selection of the next prioritizing SIP network element to which a prioritized SIP message is transmitted may be based on the associated message priority level. In one embodiment, selection of the next prioritizing SIP network element to which a prioritized SIP message is transmitted may be based on functional capabilities of respective prioritizing SIP network elements available for selection as the next prioritizing SIP network element.

In one embodiment (e.g., in which prioritizing SIP network elements available for selection as the next prioritizing SIP network element are substantially similar with respect to functional capabilities, as well as SIP message protocol) selection of the next prioritizing SIP network element to which a prioritized SIP message is transmitted may be based on non-functional capabilities (e.g., processing capacity, processing speed, quality of service parameters, reliability, and the like, as well as various combinations thereof) of the prioritizing SIP network elements available for selection. For example, emergency high-priority SIP messages (e.g., E-911) may be routed to a dedicated, high speed, highly reliable prioritizing SIP network element in order to minimize the delay of the emergency, high-priority SIP messages, while normal SIP messages are routed to one or more other prioritizing SIP network elements having lower speed, reliability, and like parameters.

In one embodiment, in which a plurality of output network connections are available for transmitting SIP messages from a current prioritizing SIP network element to a selected next prioritizing SIP network element, the current prioritizing SIP network element may select between available output network connections using various combinations of output network connection selection factors. The available output network connections may provide paths alternative paths to the same prioritizing SIP network element, or, alternatively, to different prioritizing SIP network elements. The output network selection factors may include at least one of message priority levels of prioritized SIP messages, properties of the available output networks, and the like, as well as various combinations thereof.

In one embodiment, selection between available output network connections may be based on static properties of the respective available output networks. In one embodiment, static properties considered for selecting between available output network connections may include available bandwidth (e.g., average, maximum, minimum guaranteed, and the like), network reliability, distance (e.g., number of hops) to next prioritizing SIP network element, and the like, as well as various combinations thereof). In one embodiment, dynamic properties considered for selecting between available output network connections may include current network load, network congestion probabilities, and the like, as well as various combinations thereof).

In one embodiment, PSPs configure network QOS parameters for IP packets which transport prioritized SIP messages using respective message priority levels of the SIP messages. In one embodiment, PSPs configure QOS parameters for IP packets which transport prioritized SIP messages by setting values in IP packet headers (e.g., setting values to support DiffServ). In one embodiment, PSPs configure QOS parameters for IP packets which transport prioritized SIP messages by setting transport protocol options (e.g., TCP selective acknowledgment, using different Stream Control Transmission Protocol (SCTP) streams, and the like, as well as various combinations thereof).

In one embodiment, IP networks and routers may transport IP packets conveying prioritized SIP messages according to respective message priority levels of the SIP messages. In one embodiment, in which PSPs configure network QOS parameters for IP packets which transport prioritized SIP messages using respective message priority levels of the SIP messages, downstream IP networks and associated routers may route the IP packets according to the configured network QOS parameters. In one embodiment, routers may process IP packets which transport prioritized SIP messages by mapping message priority levels into network technology specific configurations. In one such embodiment, for example, routers may map message priority levels of associated SIP messages to QOS classes of various standards such as IEEE 802.11(e), IEEE 802.1p, and the like.

In one embodiment, PSAPs configured to perform application specific operations based on SIP message content may process prioritized SIP messages based on respective message priority levels (e.g., based on the port on which each SIP message is received). In one embodiment, PSAPs may be configured to perform application specific operations based on SIP message content. In one embodiment, in which a PSAP is configured to perform one application specific operation, SIP messages having a specific message priority levels (or levels) may be routed to the PSAP. In one embodiment, in which a PSAP is configured to perform a plurality of application specific operations, PSAP processing resources may be dedicated to different application specific operations according to message priority levels of SIP messages processed by respective application specific operations.

As depicted in FIG. 1, PSP $130_1$ assigns a message priority level to each received SIP message. The PSP $130_1$ processes the prioritized SIP messages for determining routing of the prioritized SIP messages. The SIP messages having priority levels one and two are assigned to port $132_{1-12}$ for transmission to IP network $110_{2A}$. The SIP messages having priority levels three and four are assigned to port $132_{1-34}$ for transmission to IP network $110_{3A}$. The propagation of prioritized SIP messages between PSP $130_1$ and router $120_4$ (i.e., over the portion of the end-to-end path between SIP UAC $102_C$ and SIP UAS $102_S$ supporting prioritized handling of SIP messages) is described herein with respect to the communication path between PSP $130_1$ and router $120_4$ configured for SIP messages having associated message priority levels one and two.

The PSP $130_1$ determines the next SIP network element to which each SIP message is transmitted (illustratively, PSAS $140_1$). The PSP $130_1$ configures network QOS parameters for IP packets which transport the respective prioritized SIP messages. For SIP messages transmitted to IP network $110_{2A}$, PSP $130_1$ assigns QOS parameters which correspond to message priority levels one and two (denoted as QOS levels one ($QOS_1$) and two ($QOS_2$). The PSP $130_1$ transmits prioritized SIP messages to PSAS $140_1$ via IP network $110_{2A}$ using the assigned network QOS parameters. The prioritized SIP messages having message priority levels one and two are received by PSAS $140_1$ via ports $142_{1-1}$ and $142_{1-2}$, respectively. The PSAS $140_1$ processes received IP packets to extract prioritized SIP messages.

The PSAS $140_1$ determines the previously assigned message priority levels of prioritized SIP messages. In one embodiment, for example, PSAS $140_1$ determines the message priority level of each prioritized SIP message according to the port (e.g., ports $142_{1-1}$ and $142_{1-2}$) on which prioritized SIP messages are received. The PSAS $140_1$ (depending on the SIP message prioritization policy utilized by PSAS $140_1$) may retain the previously assigned message priority level or determine and assign a new message priority level. The PSAS $140_1$ processes prioritized SIP messages according to respective message priority levels. Since $P_1 > P_2$, processing of prioritized SIP messages by PSAS $140_1$ is performed such that priority is given to SIP messages having message priority level one ($P_1$). The PSAS $140_1$ transmits prioritized SIP messages to router $120_2$ via IP network $110_{2A}$ using the assigned network QOS parameters. The router $120_2$ routes prioritized SIP messages to PSP $130_2$ via IP network $110_{2B}$ using the assigned network QOS parameters.

The PSP $130_2$ determines the previously assigned message priority levels of prioritized SIP messages. The PSP $130_2$ (depending on the SIP message prioritization policy utilized by PSP $130_2$) may retain the previously assigned message priority level or determine and assign a new message priority level. In one embodiment, for example, PSP $130_2$ determines the message priority level of each prioritized SIP message according to the port (e.g., ports $132_{2-1}$ and $132_{2-2}$) on which prioritized SIP messages are received. The PSP $130_2$ processes prioritized SIP messages according to respective message priority levels. Since $P_1 > P_2$, processing of prioritized SIP messages by PSP $130_2$ is performed such that priority is given to SIP messages having message priority level one. The PSP $130_2$ determines the next SIP network element to which each SIP message is transmitted (illustratively, router $120_4$). The PSP $130_2$ may leave assigned QOS parameters unchanged or may modify the assigned network QOS parameters. The PSP $130_2$ transmits prioritized SIP messages to router $120_4$ via IP network $110_{2C}$ using the assigned/modified network QOS parameters.

Figure 4:
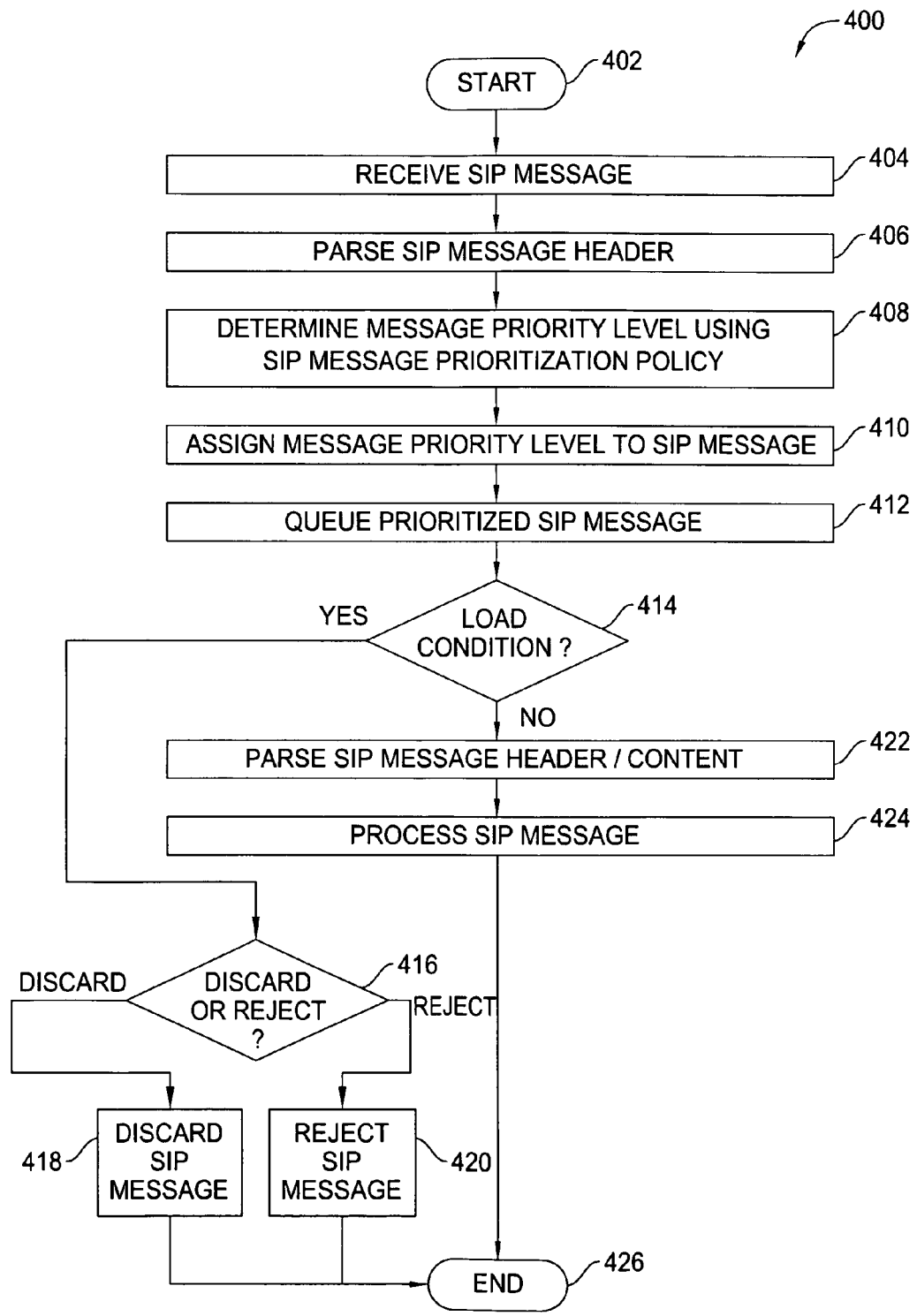
FIG. 4 depicts a method according to one embodiment of the present invention.

The router $120_4$ receives prioritized SIP messages having message priority levels of one or two from PSP $130_2$ via IP network $110_{2C}$. The router $120_4$ receives prioritized SIP messages having message priority levels of three or four from PSP $130_3$ via IP network $110_{3C}$. As depicted in FIG. 4, router $120_4$ supports QOS levels $QOS_1$, $QOS_2$, $QOS_3$, and $QOS_4$ associated with SIP messages having message priority levels $P_1$, $P_2$, $P_3$, and $P_4$, respectively. The router $120_4$ routes prioritized SIP messages to SIP UAS $102_S$ via external IP network $104_S$. In one embodiment, router $120_4$ routes prioritized SIP messages to SIP UAS $102_S$ using the respective message priority levels. Upon processing received SIP messages, SIP UAS $102_S$ may generate one or more SIP messages which may be transmitted to one or more of the SIP network components of service provider domain 101, to SIP UAC $102_C$ via service provider domain 101, and the like, as well as various combinations thereof.

Since processing along the communication path between PSP $130_1$ and router $120_4$ configured for SIP messages having associated message priority levels three and four is similar to processing along the communication path between PSP $130_1$ and router $120_4$ configured for SIP messages having associated message priority levels one and two, processing along the communication path between PSP $130_1$ and router $120_4$ configured for SIP messages having associated message priority levels three and four is not described in detail herein. Since processing along the reverse communication between router $120_4$ and PSP $130_1$ is performed in a manner similar to processing along the forward communication path between PSP $130_1$ and router $120_4$ (irrespective of message priority level), processing along the reverse communication between router $120_4$ and PSP $130_1$ is not described herein.

Figure 3:
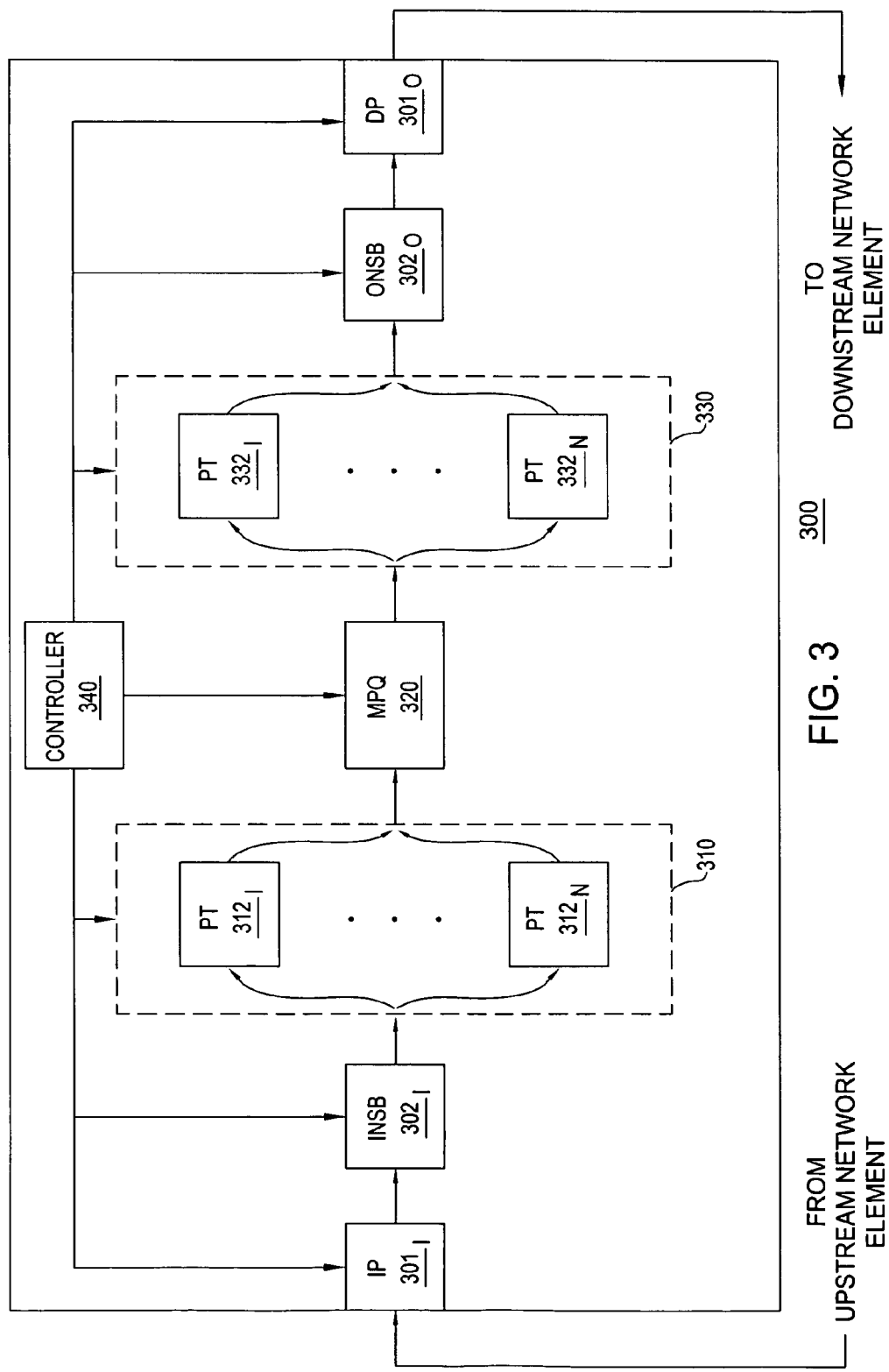
FIG. 3 depicts a high-level block diagram of a prioritizing SIP network element.

As depicted in FIG. 1, each network component (on the portion of the end-to-end path between SIP UAC $102_C$ and SIP UAS $102_S$) from PSP $130_1$ to router $110_4$ is adapted for processing each SIP message according to the associated message priority level. The message priority level of a SIP message may be used for various functions (depending on the network element processing the SIP message according to the message priority level), including selecting a next SIP network element, selecting a port within the next SIP network element, selecting an output network, selecting QOS parameters within the output network, processing the SIP message within the SIP network element according to the message priority level, and the like, as well as various combinations thereof. The assignment of a message priority level to a SIP message and processing of SIP message within a SIP network element according to the message priority level may be better understood with respect to FIG. 3-FIG. 4 depicted and described herein.

Although primarily depicted and described herein as being performed by a standalone prioritization policy management system (illustratively, PPPMS 160), in one embodiment, prioritization policy management functionality depicted and described herein may be performed by other network elements. In one embodiment, prioritization policy management functionality may be implemented as a portion of one of the prioritizing network elements (illustratively, one of routers $120_2$ or $120_3$, PSPs 130 or PSASs 140). In one embodiment, prioritization policy management functionality may be implemented as a portion of one of the one of the non-prioritizing network elements (illustratively, one of routers $120_2$ or $120_3$, or network elements located within IP networks 110). In one embodiment, prioritization policy management functionality may be distributed across a plurality of network elements (illustratively, using various combinations of routers 120, PSPs 130, PSASs 140, and the like, as well as various combinations thereof).

Although primarily depicted and described herein with respect to using four message priority levels (illustratively, message priority levels $P_1$, $P_2$, $P_3$, and $P_4$), fewer or more message priority levels may be implemented over at least a portion of a service provider domain for controlling SIP message prioritization processing on at least a portion of an end-to-end path between UAC and UAS. Although primarily depicted and described herein with respect to use of a constant number of priority levels along the portion of the end-to-end path between the UAC and UAS for which message prioritization is supported (illustratively, between PSP $130_1$ and router $120_4$), in one embodiment, fewer or more priority levels may be supported along various sub-portions of the end-to-end path between the UAC and UAS for which message prioritization is supported.

As depicted in FIG. 1, router $120_2$ supports priority levels one and two and router $120_3$ supports priority levels three and four, while router $120_4$ supports priority levels one, two, three, and four. In one example, although not depicted, router $120_2$ may not be configured as a prioritizing network element (i.e., router $120_2$ processes prioritized SIP messages independent of respective message priority levels of the prioritized SIP messages). In another example, although not depicted, router $120_2$ may be configured as a prioritizing SIP network element supporting additional message priority levels (e.g., router $120_2$ may further categorize the prioritized SIP messages such that prioritized SIP messages having message priority level one may be assigned localized message priority sub-levels (e.g., message priority levels $P_{1A}$ and $P_{1B}$) such that processing within router $120_2$ of SIP messages having priority level $P_1$ may vary according to the locally assigned message priority sub-levels.

Although primarily depicted and described herein with respect to establishment of SIP message prioritization across a specific portion of the end-to-end path between UAC $102_C$ and UAS $102_S$, in one embodiment, SIP message prioritization may be established over less or more of the end-to-end path between UAC $102_C$ and UAS $102_S$. In one embodiment, for example, SIP message prioritization may be established between less of the end-to-end path between UAC $102_C$ and UAS $102_S$. In one embodiment, for example, SIP message prioritization may be established between more of the end-to-end path between UAC $102_C$ and UAS $102_S$ (illustratively, between router $120_1$ and router $120_4$). In one embodiment, in which SIP UAC $102_C$ is adapted for assigning message priority levels to respective SIP messages, SIP message prioritization may be established between the entire end-to-end path between UAC $102_C$ and UAS $102_S$.

Figure 2:
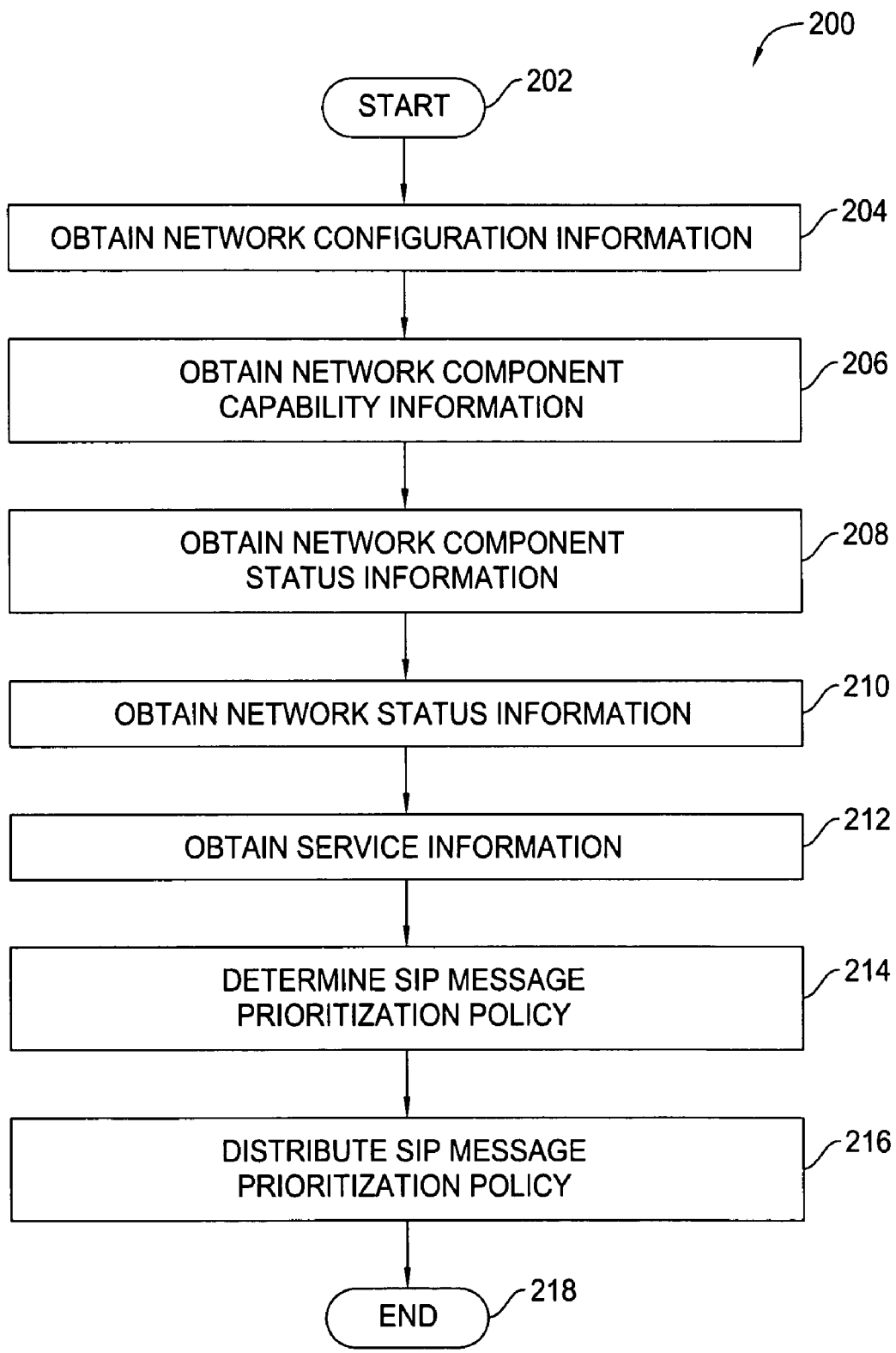
FIG. 2 depicts a method according to one embodiment of the present invention.

FIG. 2 depicts a method according to one embodiment of the present invention. Specifically, method 200 of FIG. 2 depicts a method for generating and distributing a prioritization policy. Although described with respect to determining and distributing one SIP message prioritization policy, in one embodiment, different numbers of SIP message prioritization policies may be determined and distributed to different network elements. Although described with respect to specific input information, other information described herein may be used for determining a SIP message prioritization policy. Although depicted as being performed serially, those skilled in the art will appreciate that at least a portion of the steps of method 200 may be performed contemporaneously, or in a different order than presented in FIG. 2. The method 200 begins at step 202 and proceeds to step 204.

At step 204, network configuration information is obtained. At step 206, network component capability information is obtained. At step 208, network component status information is obtained. At step 210, network status information is obtained. At step 212, service information is obtained. In one embodiment, the network configuration information, network component capability information, network status information, and service information may be obtained from various combinations of systems (e.g., inventory systems, provisioning systems, maintenance systems, and the like, as well as various combinations thereof), local databases, remote databases, network discovery, feedback messages received from network components (e.g., from prioritizing SIP network elements, from non-prioritizing SIP network elements, from non-SIP network elements, and the like, as well as various combinations thereof).

In one embodiment, network configuration information may include any information specifying connectivity of network components. For example, network configuration information may include information that port $132_{1\text{-}12}$ of PSP $132_1$ is connected to IP network $110_{2A}$ and port $132_{1\text{-}34}$ of PSP $132_1$ is connected to IP network $110_{3A}$. For example, network configuration information may include information that router $120_2$ is disposed between IP networks $110_{2A}$ and $110_{2B}$. In one embodiment, network component capability information may include any information specifying functionality supported by various network components. For example, network component capability information may include SIP message load capacity of each of the PSPs 130, application-specific functions supported by each of the PSASs 140, quality of service parameters supported by each of the routers 120, and the like, as well as various combinations thereof.

In one embodiment, network component status information includes information specifying status (e.g., actual, estimated, predicted, and the like) of associated with the operation of various network components. For example, network component status information may include resource usage status information such as CPU usage status information, memory usage status information, and the like, as well as various combinations thereof associated with any network components (e.g., routers 120, PSPs 130, PSASs 140, and the like).

In one embodiment, network status information may include any information specifying status (e.g., actual, estimated, predicted, and the like) of various network components. For example, network status information may include traffic load information (e.g., actual, estimate, and/or predicted traffic load information associated with one or more network paths, network components, network addresses, message types, dialog types, and the like, as well as various combinations thereof), traffic routing information, network component failure information, link failure information, and the like, as well as various combinations thereof, associated with any network components (e.g., IP networks 110, routers 120, PSPs 130, PSASs 140, and the like).

In one embodiment, service information may include any information associated with services which may be supported by the network, as well as services expected to be provided during specific times (e.g., day of year, day of week, time of day, and the like). For example, a large amount of VoIP traffic may be expected on Easter, Christmas, and various other holidays. For example, a large amount of VoIP traffic and instant message traffic to particular phone numbers or network addresses, respectively, may be expected due to a nationwide television entertainment show which requests that people vote for contestants by calling specific telephone numbers or text messaging specific codes.

At step 214, a SIP message prioritization policy is determined. In one embodiment, the SIP message prioritization policy is determined using at least a portion of the network configuration information, network component capability information, network status information, service information, and the like, as well as various combinations thereof. In one embodiment, the SIP message prioritization policy may be determined using various combinations of other information described herein. At step 216, the SIP message prioritization policy is distributed. The SIP message prioritization policy may be distributed using any policy distribution scheme. At step 218, method 200 ends.

Although described with respect to one SIP message prioritization policy, in one embodiment, multiple SIP message prioritization policies may be determined (e.g., for a network, a portion of a network, a network component, and the like). In one such embodiment, for example, one or more of the SIP message prioritization policies may be distributed to a network, a portion of a network, a network component, and the like, as well as various combinations thereof. In one embodiment, for example, multiple SIP message prioritization policies may be determined for distribution to multiple prioritizing SIP network elements on at least a portion of an end-to-end path between a SIP client (e.g., SIP UAC) and a SIP server (e.g., SIP UAS).

In continuation of the example in which hereinabove, in which a large amount of instant message and VoIP traffic may be expected to particular numbers/addresses due to a nationwide television entertainment show which requests that people vote by text messaging or calling specific telephone numbers, the service provider may determine a SIP message prioritization policy adapted to support the additional SIP message generated as a result of the television show while maintaining high quality of service for high-priority emergency traffic. For example, separate networks, network links, servers, and like network components may be dedicated to support the additional SIP messages generated as a result of the television show, while other networks, network links, servers, and like network components may be dedicated to support SIP messages associated with an emergency call center. The prioritization policy, once distributed to the network components, guarantees unchanged quality to regular customers and good quality to voting customers.

As described herein, prioritizing SIP network elements may use SIP message prioritization functions for performing SIP message differentiation under various conditions. In one embodiment, prioritizing SIP network elements may use SIP message prioritization functions for providing service differentiation. In one embodiment, prioritizing SIP network elements may use SIP message prioritization functions for providing customer differentiation. In one embodiment, prioritizing SIP network elements may use SIP message prioritization functions for providing SIP message filtering. In one embodiment, prioritizing SIP network elements may use SIP message prioritization functions for providing SIP message policing. Although described with respect to specific functionality capable of being implemented in a SIP network element, various other functions may be supported by SIP network elements utilizing SIP message prioritization functions.

In one embodiment, prioritizing SIP network elements may use SIP message prioritization functions for providing service differentiation. A SIP network element can receive a variety of different SIP message types (e.g., REGISTER, INVITE, MESSAGE, PUBLISH, SUBSCRIBE, NOTIFY).

In typical implementations, SIP INVITE messages are used for VoIP, multimedia sessions, push-to-talk (PTT), and the like, SIP MESSAGE messages are used for instant messaging, and SIP PUBLISH, SUBSCRIBE, NOTIFY messages are used for presence. In one embodiment, SIP message types may be used for prioritizing SIP messages. For example, in one embodiment, real-time services (initiated by SIP INVITE messages) may be assigned higher priority than non-real-time services such as instant messaging and presence. In one embodiment, in which different services use the same SIP message type(s) (e.g., PTT services and non-emergency VoIP services), service differentiation requires consideration of additional non-service-related parameters.

In one embodiment, prioritizing SIP network elements may utilize SIP message prioritization functions for providing customer differentiation. Since SIP message prioritization may utilize any information included within SIP messages, in one embodiment, SIP message prioritization may be performed using SIP message header fields adapted for differentiating between different customers (e.g., "From:" field name and associated field value, "To:" field name and associated field value, and the like, as well as various combinations thereof). In one embodiment, in which SIP network elements are adapted for providing customer differentiation, service providers may introduce various service offerings (e.g., bronze, silver, and gold). In one embodiment, in the context of IMS, the "P-Asserted-Identity" header field may be used in place of the "From:" header fields for providing customer differentiation.

In one embodiment, prioritizing SIP network elements may utilize SIP message prioritization functions for providing SIP message filtering and policing. For example, message prioritization policies may be defined such that different enterprise customers are served according to service level agreements, and excessive SIP messages from one customer can be filtered and rejected in order to avoid violation of service level agreements associated with other customers. In one such embodiment, the service level agreements may be specific to IMS services, and may include parameters not typically negotiated with respect to service level agreements (e.g., average and maximum numbers of sessions, presence messages, instant messages, and the like, as well as various combinations thereof). In one embodiment, given appropriate classification criteria based on SIP spam detection algorithms, message filtering capabilities may be applied to remove unsolicited SIP spam messages.

As described herein with respect to FIG. 1 and FIG. 2, centralized prioritization policy management enables a coordinated treatment of message priority levels across SIP network elements. The coordinated treatment of message priority levels across SIP network elements requires initial prioritization of each SIP message by a prioritizing SIP network element, as well as support for processing of each prioritized SIP message by each prioritizing SIP network element. The initial prioritization of SIP messages by a prioritizing SIP network element (and subsequent processing of prioritized SIP messages within the prioritizing SIP network element) according to respective assigned message priority levels may be better understood with respect to FIG. 3 and FIG. 4 depicted and described herein.

As described herein, despite careful network engineering, situations may arise in which a SIP network element within a service provider domain temporarily receives more messages than the SIP network element is capable of processing, often resulting in delaying of SIP messages and, sometimes, dropping of SIP messages. The delaying and dropping of SIP messages may result in various network quality problems, such as decreases in user-perceived quality (e.g., unacceptable call setup times), failure of critical services (e.g., failure of emergency calls), and the like. In one embodiment, a prioritizing SIP network element may differentiate between SIP messages using a message prioritization mechanism which controls priority-based processing of SIP messages within the prioritizing SIP network element. The use of SIP message prioritization within a SIP network element enables end-to-end SIP message prioritization within SIP-based networks.

The number of messages in a SIP network element represents the load of the SIP network element. A high-load condition associated with a SIP network element may be defined as a condition in which the SIP network element receives more messages than it is capable of processing within a certain time interval. In one embodiment, under a high-load condition, the SIP network element retains control over the processing of the excess SIP messages. An overload condition associated with a SIP network element may be defined as a condition in which a message threshold (e.g., the number of SIP messages for which the SIP network element is designed or dimensioned) is exceeded such that a portion of the SIP messages may become beyond the control of the SIP network element. The use of SIP message prioritization within a SIP network element enables more efficient handling of SIP messages under high-load, overload, and like conditions.

FIG. 3 depicts a high-level block diagram of a prioritizing SIP network element. Although primarily depicted and described as a standalone SIP network element adapted for prioritizing SIP messages using one or more SIP message prioritization policies and processing prioritized SIP message using respective assigned message priority levels, it should be noted that prioritizing SIP network element 300 may operated within the context of a network including other prioritizing SIP network elements as depicted and described herein with respect to FIG. 2 and FIG. 3. Thus, although primarily described herein from the perspective of a standalone SIP network element, it should be noted that prioritizing SIP network element 300 may be used for conveying message priority levels of associated SIP messages between other prioritizing SIP network elements (not depicted).

As depicted in FIG. 3, prioritizing SIP network element 300 includes an input port (IP) $301_I$, an input network socket buffer (INSB) $302_I$, a prioritization stage (PS) 310, a message priority queue (MPQ) 320, a processing stage (PS) 330, an output network socket buffer (ONSB) $302_O$, and an output port (OP) $301_O$. The IP $301_I$, INSB $302_I$, PS 310, MPQ 320, PS 330, ONSB $302_O$, and OP $301_O$ are controlled by a controller 340. The PS 310 includes a plurality of prioritization threads (PTs) $312_1$-$312_N$ (collectively, PTs 312). The PS 330 includes a plurality of processing threads (PTs) $332_1$-$332_N$ (collectively, PTs 332). Although depicted and described with respect to one input port and one output port, prioritizing SIP network elements may include additional input ports and output ports.

As depicted in FIG. 3, incoming messages are received at IP $301_I$. Since SIP allows use of several transport protocols, including connection-oriented protocols (e.g., TCP, SCTP, and the like) and connectionless protocols (e.g., UDP), various different message types may be received at IP $301_I$. The reception of messages is handled by waiting for the incoming messages. The incoming messages received at IP $301_I$ are read into INSB $302_I$. The incoming messages stored in INSB $302_I$ are processed in order to convert the incoming messages into SIP messages. The amount of processing required to convert the incoming messages into SIP messages depends on the transport protocol. For example, for UDP the complete SIP message is included within a single UDP packet, whereas TCP is a stream-based protocol without built-in message boundaries. For TCP, a SIP message boundary is found by scanning the incoming byte stream to find the content-length header value and the end-of-header marker. If transport layer security (TLS) is employed, decryption processing is performed.

As depicted in FIG. 3, SIP messages from INSB $302_I$ are processed by PS 310. The PS 310 process SIP messages in order to convert each SIP message from the wire format (i.e., SIP) to an internal message data structure including the SIP message header (i.e., SIP message header fields including respective SIP message header field names and associated SIP message header field values) and the SIP message content. The PS 310 parses each SIP message in order to determine a message priority level associated with the SIP message. The determined message priority levels are assigned to the respective SIP messages for use in processing the SIP messages. The PS 310 performs parsing and prioritization of SIP messages using a plurality of parsing and processing threads (illustratively, PTs 312).

In order to determine the message priority level of a SIP message, at least a portion of the message must be parsed. Since such parsing is required regardless of the message priority level (since the message priority level is not yet assigned), parsing should be performed as efficiently as possible so as not to waste message parsing resources on low priority messages which may be rejected later. The SIP message is parsed in order to determine information adapted for use in determining an associated message priority level. A SIP message prioritization policy is applied to the information in order to determine and assign an associated message priority level to each SIP message. In one embodiment, in which multiple SIP message prioritization policies are available, at least a portion of the information may be used to select the SIP message prioritization policy used to determine and assign the associated message priority level.

In one embodiment, in order to determine a message priority level of a SIP message, at least a portion of the associated SIP message header may be parsed. In one embodiment, the message priority level may be determined using one or more SIP message header fields (e.g., parsing respective SIP message header field names and associated SIP message header field values). In one embodiment, for example, the message priority level of a SIP message may be determined using at least one associated SIP message characteristic (e.g., SIP message type, SIP message length, and the like, as well as various combinations thereof). The SIP message type may be determined by parsing at least a portion of the SIP message header (e.g., the first line of the SIP message header). Although primarily described with respect to parsing of SIP message headers in order to determine message priority levels, other information may be used to determine message priority levels.

In one embodiment, SIP messages may include respective header fields indicative of message importance which may be used to determine an associated message priority level. In one embodiment, for example, a SIP message header may include a "Priority:" header field name. In this example, the "Priority:" header field name indicates the importance of the request to the receiver, and the associated SIP message header field value may include one of non-urgent, normal, urgent, or emergency. In one embodiment, for example, a SIP message header may include a "Resource-Priority:" header field name. In this example, the "Resource-Priority:" header field name indicates the importance of the dedicating resources to the SIP message, and may include several priority levels for distinct domains (e.g., namespaces). As described herein, in one embodiment, such header fields indicating respective message importance may be mapped into a corresponding message priority level; however, since not all SIP messages include such information, determination and assignment of message priority levels may be performed using various other parameters, fields, values, and the like, as well as various combinations thereof.

As depicted and described herein with respect to network-level SIP message prioritization, in one embodiment, prioritization of SIP messages may be performed using one or more SIP message prioritization policies distributed to the SIP network element by a central prioritization policy management system (illustratively, PPMS 160). In one such embodiment, SIP message prioritization policies may use various combinations of SIP message prioritization factors for prioritizing SIP messages. In one embodiment, in which a SIP message prioritization policy does not account for certain SIP message prioritization factors, prioritizing SIP network elements may perform SIP message prioritization using one or more SIP message prioritization policies in conjunction with one or more SIP message prioritization factors.

In one embodiment, SIP message prioritization factors may include one or more of network characteristics (e.g., network traffic patterns, network traffic load, and the like, as well as various combinations thereof), prioritizing SIP network element type (e.g., prioritization of SIP messages may differ for UACs, PSPs, PSASs, UASs, and the like), prioritizing SIP network element load characteristics, SIP message characteristics (e.g., SIP message type, SIP message length, and the like, as well as various combinations thereof), SIP message header fields (including respective SIP message header field names and associated SIP message header field values), SIP message content fields (including SIP message content field names and associated SIP message content field values), time (e.g., day of year, day of week, time of day, and the like), service provider requirements, and the like, as well as various combinations thereof.

The assignment of the determined message priority level to the SIP message may be performed using at least one of a plurality message priority level assignment schemes. In one embodiment, selection of the at least one message priority level assignment scheme may be pre-configured. In one embodiment, selection of the at least one message priority level assignment scheme may be performed using the SIP message prioritization policy. In one embodiment, the determined message priority level of a SIP message may be determined and, optionally, maintained, by a controller (illustratively, controller 340).

In one embodiment, a determined message priority level may be assigned to a SIP message by providing an indication of the message priority level within the SIP message. In one embodiment, the message priority level may be assigned by modifying at least a portion of the SIP message header (e.g., adding a SIP message header field having a SIP message header field name and value, modifying a SIP message header field value of an existing SIP message header field, and the like, as well as various combinations thereof). In one embodiment, message priority level may be assigned by adding an additional SIP message header. In one embodiment, the message priority level may be assigned by modifying at least a portion of the SIP message body (e.g., adding a SIP message body field having a field name and value, modifying a SIP message body field value of an existing SIP message body field, and the like, as well as various combinations thereof).

In one embodiment, a determined message priority level may be assigned to a SIP message by associating the SIP message with one of a plurality of message processing threads (illustratively, PTs 332) according to the message priority level. In one embodiment, for example, in which a SIP message prioritization policy defines four message priority levels, four message processing threads may be maintained by a controller such that each message processing thread is associated with a different one of the four message priority levels (i.e., a SIP message determined to have a particular message priority level is assigned to the message processing thread associated with that message priority level).

Although described with respect to a one-to-one relationship between message priority level and message processing thread, in various other embodiments, SIP messages determined to have one or more of the message priority levels may be assigned to one of a plurality of message processing threads (e.g., more message processing threads are available for processing higher priority messages), multiple message priority levels may be assigned to one message processing thread (e.g., SIP messages with message priority levels of one and two are assigned to a first message processing thread while SIP messages with message priority levels of three and four are assigned to a second message processing thread), and the like, as well as various combinations thereof.

In one embodiment, a determined message priority level may be assigned to a SIP message by positioning of the SIP message within a message priority queue. The SIP message is positioned within the message priority queue according to the determined message priority level of the SIP message and the respective message priority levels of SIP messages in the message priority queue at the time that the SIP message is assigned to the message priority queue. In one embodiment, positioning of a SIP message within a message priority queue may include locating an insertion position within the message priority queue according to the assigned message priority level of the SIP message being queued and a plurality of other assigned message priority levels of a respective plurality of other SIP messages queued within the message priority queue, and inserting the SIP message within the located insertion position.

As depicted in FIG. 3, prioritized SIP messages are queued in MPQ 320. In one embodiment, prioritized SIP messages are queued within MPQ 320 according to the respective message priority levels such that average queuing delay of higher priority SIP messages is less than average queuing delay of lower priority SIP messages. Since incoming SIP messages may be assigned higher message priority levels than message priority levels of SIP messages current queued in MPQ 320, prioritization of arriving SIP messages may cause reordering of SIP messages within MPQ 320. The re-ordering of prioritized SIP messages within MPQ 320 does not violate the protocol rules of the SIP protocol.

Although primarily depicted and described with respect to a prioritizing SIP network element including one message priority queue, in various other embodiments, multiple message priority queues may be used for assigning message priority levels to SIP messages. In one embodiment, for example, in which a SIP message prioritization policy defines four message priority levels, four message priority queues may be utilized such that each message priority queue is associated with a different one of the four message priority levels (i.e., a SIP message determined to have a particular message priority level is assigned to the message priority queue associated with that message priority level).

Although described with respect to a one-to-one relationship between message priority level and message priority queue, in various other embodiments, SIP messages determined to have one or more of the message priority levels may be assigned to one of a plurality of message priority queues (e.g., more message priority queues are available for processing higher priority messages), multiple message priority levels may be assigned to one message priority queue (e.g., SIP messages with message priority levels of one and two are assigned to a first message priority queue while SIP messages with message priority levels of three and four are assigned to a second message priority queue), and the like, as well as various combinations thereof.

In one embodiment, SIP network element 300 may control which SIP messages are prioritized (or discarded/rejected) during load conditions (e.g., high-load conditions, overload conditions, and the like). In one embodiment, upon detection of one or more load conditions, one or more SIP messages may be discarded. In one embodiment, upon detection of one or more load conditions, one or more SIP messages may be rejected. In one embodiment, selection between discarding and rejection of each SIP message may be performed using at least one of the SIP message prioritization policy, one or more load condition characteristics (e.g., extent of the load condition such high-load conditions versus overload conditions, the duration of the load condition, and the like, as well as various combinations thereof), respective message priority levels of the SIP messages, and the like, as well as various combinations thereof.

In one embodiment, selection of which SIP messages to discard/reject may be performed using at least one of a plurality of message discard/reject factors. In one embodiment, selection of which SIP messages to discard/reject may be performed using respective message priority levels of SIP messages available for selection to be discarded/rejected (e.g., SIP messages assigned the lowest message priority level are discarded/rejected first, and so on). In one embodiment, selection of which SIP messages to discard/reject may be performed using the SIP message prioritization policy. In one embodiment, selection of which SIP messages to discard/reject may be performed using one or more SIP message characteristics (e.g., message type, dialog type, and the like, as well as various combinations thereof). In one embodiment, selection of which SIP messages to discard/reject may be performed using one or more load condition characteristics.

In one embodiment, selection of which SIP messages to discard/reject may be performed using status information. In one embodiment, selection of which SIP messages to discard/reject may be performed using network element status information such as current network element status information (e.g., CPU load, memory usage, and like parameters associated with the current network element on which prioritization of SIP messages is performed). In one embodiment, selection of which SIP messages to discard/reject may be performed using network status information such as network resource information (e.g., discarding/rejecting SIP messages intended for a network having minimal network resources), network traffic load information (e.g., discarding/rejecting SIP messages intended for a network with a high traffic load), and the like, as well as various combinations thereof.

As described herein, in one embodiment, selection of which SIP messages to discard/reject may be performed using a plurality of message discard/reject factors. In one such embodiment, for example, in which SIP messages assigned the lowest priority level outnumber the number of SIP messages which must be discarded/rejected in response to a load condition, selection among the SIP messages assigned the lowest message priority level may be performed according to the SIP message prioritization policy such that SIP messages having specific message types or belonging to specific dialog types are selected to be discarded/rejected prior to SIP messages having other specific message types or belonging to other specific dialog types.

Although primarily described herein with respect to either discarding SIP messages or rejecting SIP messages, in one embodiment, a prioritizing SIP network element may perform combinations of discarding and rejecting of SIP messages. In one embodiment, for example, in response to detection of a load condition, SIP messages assigned the lowest message priority level may be classified according to respective message types of the SIP messages assigned the lowest message priority level such that SIP messages having one specific message type are discarded while SIP messages having another specific message type are rejected. Although described with respect to specific parameters, in various other embodiments, various other parameters may be used by a prioritizing SIP network element for selecting between discarding and rejecting SIP messages.

In one embodiment, MPQ 320 enables SIP network element 300 to control which SIP messages are prioritized (or discarded/rejected) during load conditions. In the absence of MPQ 320, SIP messages may be arbitrarily dropped from network buffers (illustratively, NSB 302$_I$) in response to various conditions (e.g., if respective capacities of the network buffers cross a threshold, if respective capacities of network buffers are exceeded, and the like). In order to ensure that SIP messages are prioritized prior to being discarded/rejected under load conditions: 1) sufficient SIP network element resources must be allocated to reading incoming SIP messages from network buffers into MPQ 320 and 2) effective SIP message prioritization (or discard/rejection) processing must be performed on messages received from network buffers prior to queuing of the prioritized SIP messages in MPQ 320.

Since SIP messages are typically retransmitted if not processed within a certain time interval, the maximum number of SIP messages queued in MPQ 320 has a practical limit, and increasing the length of MPQ 320 is generally ineffective to handle load conditions. In one embodiment, SIP network element 30 may discard (i.e., drop) SIP messages in response to a load condition. In another embodiment, since simply discarding SIP messages may trigger one or more SIP message retransmissions which may exacerbate load conditions, rather than discarding messages under load conditions, SIP network element 300 may include SIP message rejection processing. In one such embodiment, since message retransmission is an important aspect of the SIP protocol, message retransmission may be accounted for in the SIP message rejection strategy employed within prioritizing SIP network elements.

The effects of message dropping may be illustrated with the following example. For example, after sending a request message, a corresponding response message (e.g., a 2xx response, indicating a successful request) is expected. As an exception, the sender of a 2xx response message on an INVITE message expects an ACK request message in reply. If a response message is not received within a certain time interval, the request message is typically retransmitted. For example, for UDP, an INVITE message is retransmitted according to an exponential back-off scheme in which the interval is doubled each period (e.g., it defaults to 0.5, 1, 2, 4, 8, and 16 seconds, i.e., up to 6 retransmissions). As another example, for any transport protocol, a 2xx response to an INVITE message is by default retransmitted up to ten times according to the scheme: 0.5, 1, 2, 4, . . . , 4 seconds).

The effects of message dropping may be further illustrated with the following examples. The dropping of a request sent over an unreliable transport (UDP) will eventually trigger a retransmission by the sender (unless it was the last retransmission). The dropping of a non-INVITE response sent over UDP will eventually trigger a retransmission by the corresponding request by the original sender, which will cause a retransmission of the response (if the retransmitted request arrives). The dropping of a 2xx response to an INVITE will eventually trigger a retransmission of the response on any transport. This retransmission ends when an ACK is received. As described herein, in some instances, in order to prevent detrimental effects of retransmissions triggered in response to discarding of SIP messages, a SIP message rejection strategy implemented as a portion of the prioritizing SIP network element.

In one embodiment, under load conditions, rather than discarding SIP messages, SIP messages may be rejected. In one embodiment, rejection of SIP messages according to message priority levels may be performed in a manner for preventing retransmissions. In one embodiment, in order to avoid retransmissions, rather than rejecting SIP messages, the SIP network element may respond with an error message (e.g., 503 service unavailable for congestion control). In one such embodiment, a "Retry-After:" may be inserted within the SIP message header to extend the amount of time that passed before retransmission of the SIP message is attempted (attempting to ensure that the next time that SIP message is received the SIP network element is no longer experiencing a high-load condition, overload condition, or any other like conditions). In one embodiment, error messages may be prioritized (e.g., assigned a message priority level) using a SIP message prioritization policy and processed using the SIP message priority level.

As depicted in FIG. 3, prioritized SIP messages from MPQ 320 are processed by PS 330. The PS 330 processes prioritized SIP messages, according to the respective assigned message priority levels, using a plurality of processing threads in parallel (illustratively, PTs 332). The processing of prioritized SIP messages depends on system state. During processing of prioritized SIP messages, system state is updated according to SIP protocol rules which may include proprietary rules, rules defined in various Internet standards, RFCs, and the like (e.g., RFC3261, RFC3263, and the like), and the like, as well as various combinations thereof. The processing of prioritized SIP messages depends on various processing factors such as prioritization policy, prioritizing SIP network element type, prioritized SIP message type, and the like, as well as various combinations thereof.

The processing of prioritized SIP messages may depend on the processing functions supported by the prioritizing SIP network element (e.g., depending on the prioritizing SIP network element type). For example, processing of SIP messages may differ for UACs, PSPs, PSASs, UASs, and the like. The processing of prioritized SIP messages may depend on one or more SIP message prioritization policies, other processing policies, and the like, as well as various combinations thereof. Under certain circumstances, processing of prioritized SIP messages may require interaction with external systems (e.g., performing DNS lookups, retrieving information from various databases, and the like, as well as various combinations thereof).

In one embodiment, priority-based message processing performed by PS 330 may be implemented as a strict priority-based message processing scheme. In a strict priority-based message processing scheme, message priority levels assigned to respective SIP messages determines relative order in which SIP messages are processed by PS 330 (i.e., influences how message processing wait time is distributed over SIP messages having different associated message priority levels, thereby resulting in lower average delay times for higher priority SIP messages at the cost of higher average delay times for lower priority SIP messages). Since a strict priority-based message processing scheme may have a risk of message starvation (which occurs when there are so many high priority messages that low priority messages do not get processed), various other priority-based message processing schemes may be used in accordance with the present invention.

In one embodiment, priority-based message processing performed by PS 330 is implemented as a weighted priority-based message processing scheme. In a weighted priority-based message processing scheme, weights may be assigned to the various message priority levels. The assigned weights may be static or dynamic weight assignments. In one embodiment, priority-based message processing performed by PS 330 is implemented as a strict-weighted priority-based message processing scheme. In a strict-weighted priority-based message processing scheme, absolute priority may be given to a portion of the message priority levels and weights may be assigned to the remaining message priority levels. In one such embodiment, for example, absolute priority may be given to the highest message priority level(s) and proportional weights may be assigned to the lower priority level(s).

In one embodiment, PTs 332 of PS 330 process SIP messages in order to convert each SIP message from an internal data structure format including the SIP message header (including SIP message header field names and associated SIP message header field values) and the SIP message content to the wire format (i.e., SIP). The SIP messages may be prioritized SIP messages (e.g., in a network configured for providing cross-element prioritization of SIP messages) or non-prioritized SIP messages (e.g., in a network in which SIP message prioritization is confined to use within SIP network elements). The message bytes of the SIP messages are serialized and buffered in ONSB $302_O$. The buffered SIP message bytes are transmitted using OP $301_O$.

As depicted in FIG. 3, prioritizing SIP network element 300 is adapted to propagate determined/assigned message priority levels of SIP messages to other network elements. As described herein, prioritizing SIP network element 300 may propagate message priority levels of SIP messages using one or more message priority level propagation methods. In one embodiment, a message priority level may be propagated by modifying the SIP message (e.g., modifying one or more SIP message header field values, adding one or more SIP message header fields including associated SIP message header field names and corresponding SIP message header field values, modifying one or more SIP message body field values, and the like, as well as various combinations thereof). In one such embodiment, modification of the SIP message to support propagation of the message priority level is performed during assignment of the determined message priority level.

In one embodiment, a message priority level may be propagated by assigning the SIP message to traverse a particular network (illustratively, assigning a SIP message to traverse IP network $110_{2A}$ rather than IP network $110_{3A}$), assigning the SIP message to be delivered to a network element (illustratively, assigning a SIP message to be delivered to PSAS $140_1$ rather than PSAS $140_2$), and the like, as well as various combinations thereof. In one embodiment, a message priority level may be propagated by assigning the SIP message to a particular output port on the source network element from which the SIP message is transmitted. In one embodiment, a message priority level may be propagated by assigning the SIP message to a particular input port on the destination network element to which the SIP message is transmitted.

Although primarily described herein with respect to initial prioritization of SIP messages, in one embodiment, since at least a portion of the received SIP messages may include prioritized SIP messages (i.e., previously prioritized by upstream prioritizing SIP network elements), prioritizing SIP network element 300 may perform processing in order to identify previously assigned message priority levels of received SIP messages. In one embodiment, prioritizing SIP network element 300 may determine whether each received SIP message already has an assigned message priority level. In one embodiment, PS 310 may parse at least a portion of each received SIP message (e.g., parsing a portion of a SIP message header) to determine whether a message priority level was previously assigned, determine a previously assigned message priority level, and the like. In one embodiment, the SIP message prioritization policy implemented by prioritizing SIP network element 300 may use the previously assigned message priority level in order to determine and assign the message priority level.

Although primarily depicted and described with respect to use of one prioritization stage, one message priority queue, and one processing stage for handling SIP messages for one IP input port and one IP output port, prioritizing SIP network elements may include additional input ports and output ports. In one embodiment, a prioritization stage, a message priority queue, and a processing stage may be dedicated to handling SIP messages for one input port and one output port. In one embodiment, various combinations of one or more prioritization stages, one or more message priority queues, and one or more processing stages may be dedicated to handling SIP messages for one input port and one output port. In one embodiment, various combinations of one or more prioritization stages, one or more message priority queues, and one or more processing stages may be dedicated to handling SIP messages for multiple input ports and multiple output ports.

Although primarily depicted and described herein with respect to use of parallel threads (illustratively, parallel PTs 312 and parallel PTs 332), various other threading strategies may be utilized for parsing/prioritizing or processing SIP messages. In one embodiment, for example, controller 340 (or another module) may maintain a thread pool of available threads. In one such embodiment, controller 340 may select a parsing/prioritizing thread from the thread pool for each SIP message entering PS 310 and select a processing thread from the thread pool for each SIP message entering PS 330. Although depicted and described herein with respect to use of various threading strategies, various other threading strategies may be used in accordance with the present invention.

FIG. 4 depicts a method according to one embodiment of the present invention. Specifically, method 400 of FIG. 4 depicts a method for processing a received SIP message at a prioritizing network element. Although depicted as being performed serially, those skilled in the art will appreciate that at least a portion of the steps of method 400 may be performed contemporaneously, or in a different order than presented in FIG. 4. The steps of method 400 may be better understood with respect to prioritizing SIP network element 300 depicted and described herein with respect to FIG. 3. The method 400 begins at step 402 and proceeds to step 404.

At step 404, a SIP message is received. The SIP message may be received from any network element (SIP or non-SIP, prioritizing or non-prioritizing, and the like). At step 406, the SIP message header of the received SIP message is parsed. In one embodiment, the parsing is performed in a manner for minimizing at least one of a size of the parsed portion of a SIP message header, a parsing time during which the SIP message header is parsed, and the like, as well as various combinations thereof. The parsing of the received SIP message may be performed using various parsing algorithms. In one embodiment, for example, parsing of the SIP message may be performed using at least a portion of the SIP message parsing functions described in the patent application entitled "Method and Apparatus For Identifying Message Filed Names" (patent application Ser. No. 11/318,843).

At step 408, the message priority level of the received SIP message is determined using at least one SIP message prioritization policy. In one embodiment, the message priority level of the received SIP message is determined using the SIP message prioritization policy in conjunction with information obtained from the parsing of the SIP message header. In one embodiment, the message priority level of the received SIP message may be determined using a plurality of SIP message prioritization policies, various portions of a plurality of SIP message prioritization policies, and the like, as well as various combinations thereof.

In one embodiment, determining the message priority level of the SIP message may include determining whether the received SIP message was previously prioritized (i.e., whether the received SIP message has an assigned message priority level assigned by an upstream SIP network element). In one embodiment, in which the assigned message priority level is conveyed in the SIP message header, the determination as to whether the received SIP message is a prioritized SIP message may be made using information from parsing of the SIP message header. In one embodiment, in which the SIP message prioritization policy accounts for previously assigned message priority level, the current message priority level of the received SIP message may be determined, at least in part, using the previously assigned message priority level.

At step 410, the determined message priority level is assigned to the SIP message. In one embodiment, the assignment of the message priority level to the SIP message may be performed using one of a plurality message priority level assignment schemes described herein (e.g., positioning the SIP message within a queue, assigning the SIP message to one of a plurality of queues, assigning the SIP message to one of a plurality of message processing threads, modifying the message header, and the like, as well as various combinations thereof). At step 412, the prioritized SIP message is queued. In one embodiment, the prioritized SIP message is queued according to the determined and assigned message priority level. At step 414, a determination is made as to whether to process the SIP message.

In one embodiment, the determination as to whether to process the SIP message depends on whether a load condition is detected by the prioritizing SIP network element during the time during which the prioritized SIP message is queued. In one embodiment, in no load condition is detected during the time during which the prioritized SIP message is queued, the prioritized SIP message is processed. In one embodiment, in a load condition is detected during the time during which the prioritized SIP message is queued, the prioritized SIP message may or may not be processed depending on various factors described herein (e.g., extent of the load condition, assigned message priority leve, SIP message prioritization policy, and the like, as well as various combinations thereof).

In one embodiment, the prioritizing SIP network element monitors for detection of load conditions. In one embodiment, the determination as to whether a load condition is detected may be performed by monitoring various load status parameters of the prioritizing SIP network element (e.g., CPU load, memory usage, queue capacity, and the like, as well as various combinations thereof). In one embodiment, for example, a high-load condition may be detected when one or more of the load status parameters reaches 75% utilization (e.g., message priority queue is 75% utilized) and an overload condition may be detected when one or more of the status parameters reaches 90% utilization (e.g., message priority queue is 75% utilized). In one embodiment, the determination as to whether a load condition is detected may be performed using various other factors.

If the SIP message is not processed, method 400 proceeds to step 416. At step 416, a determination is made as to whether to discard the SIP message or reject the SIP message. As described herein, the decision as to whether a SIP message is discarded or rejected may be based on various combinations of parameters and information. If the SIP message is to be discarded, method 400 proceeds to step 418 where the SIP message is discarded, as described herein. If the SIP message is to be rejected, method 400 proceeds to step 420 where the SIP message is rejected, as described herein. From steps 418 and 420, method 400 proceeds to step 426, where method 400 ends. If the SIP message is processed, method 400 proceeds to step 422.

At step 422, the SIP message is parsed. In one embodiment, the SIP message header is parsed. In one such embodiment, only the portion of the SIP message header not previously parsed to determine the message priority level is parsed. In one embodiment, at least a portion of the SIP message content is parsed. At step 424, the SIP message is processed for performing at least one function (e.g., routing the SIP message, performing an application-specific function, and the like, as well as various combinations thereof). As described herein, the prioritized SIP message may be processed using the information obtained during the parsing of the prioritized SIP message. From step 424, method 400 proceeds to step 426 where method 400 ends.

Figure 5:
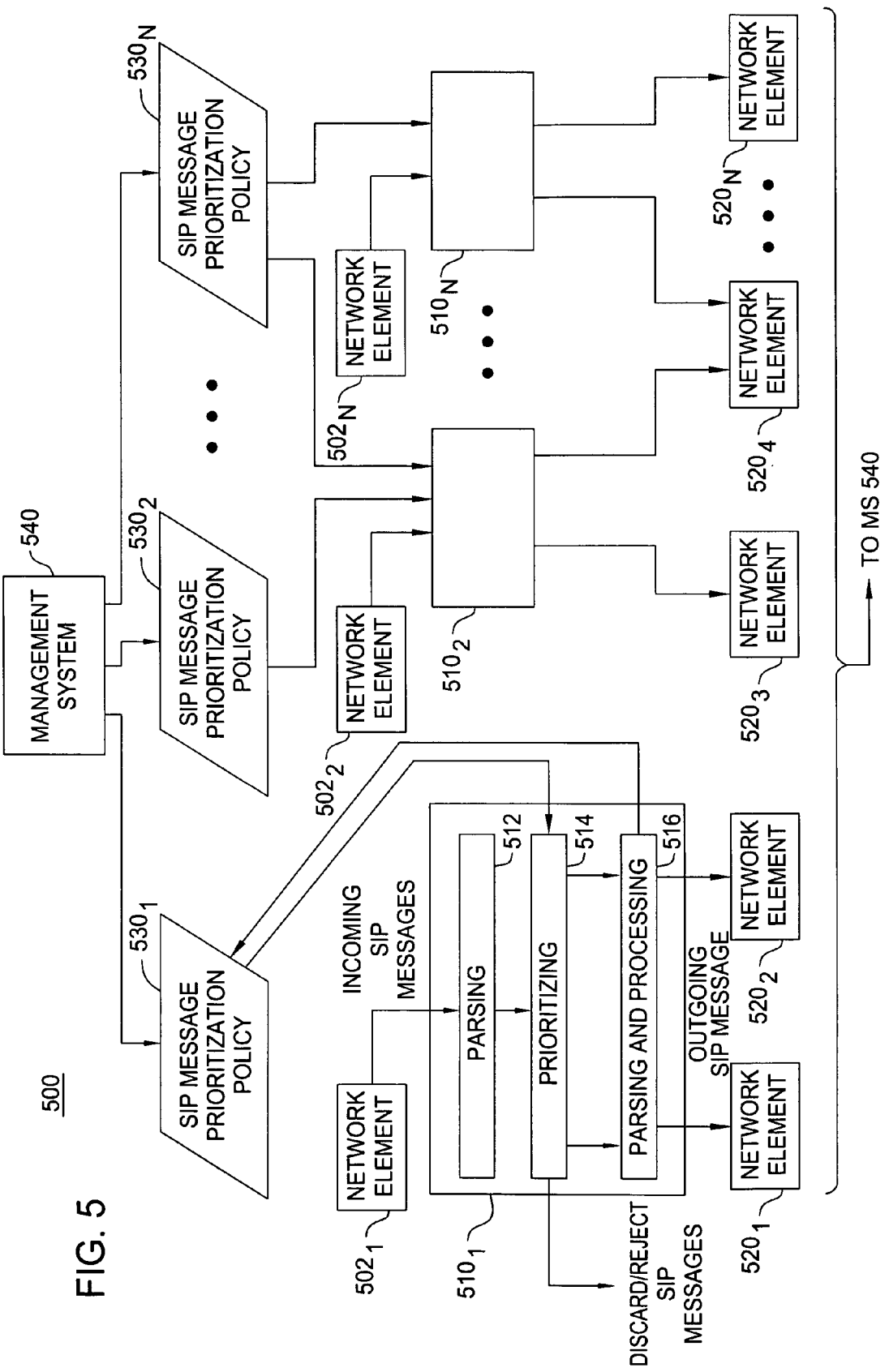
FIG. 5 depicts a high-level block diagram of a prioritization architecture from the perspective of a plurality of prioritizing SIP network elements using associated SIP message prioritization policies for prioritizing SIP messages and processing SIP messages using message priority levels of the prioritized SIP messages.

FIG. 5 depicts a high-level block diagram of a prioritization architecture from the perspective of a plurality of prioritizing SIP network elements using associated SIP message prioritization policies for prioritizing SIP messages and processing SIP messages using message priority levels of the prioritized SIP messages. Specifically, prioritization architecture 500 of FIG. 5 includes pluralities of network elements $502_1$-$502_N$ (collectively, network elements 502), a plurality of prioritizing SIP network elements $510_1$-$510_N$ (collectively, prioritizing SIP network elements 510), pluralities of network elements $520_1$-$520_N$ (collectively, network elements 520), and management system 540.

As depicted in FIG. 5, management system 540 generates a plurality of SIP message prioritization policies $530_1$-$530_N$ (collectively, SIP message prioritization policies 530). As depicted in FIG. 1, one or more of SIP message prioritization policies may be distributed to each of the prioritizing SIP network elements 510 (illustratively, SIP message prioritization policy $530_1$ is distributed to prioritizing SIP network element $510_1$, SIP message prioritization policy $530_2$ is distributed to prioritizing SIP network element $510_2$, and SIP message prioritization policy $530_N$ is distributed to prioritizing SIP network elements $510_2$ and $510_3$. Although omitted for purposes of clarity, in one embodiment, one or more of the SIP message prioritization policies 530 may be distributed to various other network elements (e.g., network elements 502, network elements 520, and the like, as well as various combinations thereof.

As depicted in FIG. 5, prioritizing SIP network elements $510_1$-$510_N$ receive incoming SIP messages from pluralities of network elements $502_1$-$502_N$, respectively. As depicted in FIG. 2, prioritizing SIP network elements $510_1$-$510_N$ receive incoming SIP messages from pluralities of network elements $502_1$-$502_N$, respectively. In one embodiment, network elements 502 may include SIP UAs, non-prioritizing and prioritizing SIP network elements, non-SIP network elements (e.g., routers), and the like, as well as various combinations thereof. Although depicted and described as distinct pluralities of network elements, at least a portion of the network elements of respective pluralities of network elements 502 may be the same (e.g., at least a portion of the network elements may be common to network elements $502_1$, network elements $502_2$, and the like). Although not depicted, at least a portion of prioritizing SIP network elements 510 may belong to one or more of the pluralities of network elements 502 such that exchanging of messages between prioritizing SIP network elements 510 is supported.

As depicted in FIG. 5, prioritizing SIP network elements $510_1$-$510_N$ transmit outgoing SIP messages to various combinations of network elements 520. As depicted in FIG. 2, prioritizing SIP network element $510_1$ transmits outgoing SIP messages to network elements $520_1$ and $520_2$, prioritizing SIP network element $510_2$ transmits outgoing SIP messages to network elements $520_3$ and $520_4$, and prioritizing SIP network element $510_N$ transmits outgoing SIP messages to network elements $520_4$ and $520_N$. In one embodiment, network elements 520 may include SIP UAs, non-prioritizing and prioritizing SIP network elements, non-SIP network elements (e.g., routers), and the like, as well as various combinations thereof. Although depicted and described as distinct network elements, at least a portion of network elements 520 may be other network elements depicted and described herein (e.g., network element $520_3$ may represent a prioritizing SIP network element such as prioritizing SIP network element $510_N$ such that prioritizing SIP network element $510_2$ transmits outgoing SIP messages to prioritizing SIP network element $510_N$.

As depicted in FIG. 5, network elements 502 transmit SIP messages to prioritizing SIP network elements 510 and prioritizing SIP network elements transmit SIP messages to network elements 520. Since, as depicted in FIG. 1, various combinations of SIP network elements and non-SIP network elements may communicate in various different configurations in order to provide SIP message prioritization between network elements (e.g., over at least a portion of an end-to-end path between a SIP UAC and a SIP UAS), the present invention is not intended to be limited by prioritization architecture 500 of FIG. 5. Although not depicted as communicating (for purposes of clarity in describing functions associated with prioritizing SIP network elements), as described herein, various combinations of prioritizing SIP network elements 510 may communicate for propagating message priority levels of SIP messages between network elements.

As depicted in FIG. 5, prioritizing SIP network element 510 includes a parsing module 512, a prioritizing module 514, and a parsing and processing module 516. Although depicted and described as including specific parsing, prioritizing, and processing modules, as described herein with respect to FIG. 3, in other embodiments, parsing module 512 and prioritizing module 514 may be implemented as a single module, parsing and processing module 516 may be implemented using a plurality of modules (e.g., a parsing module for parsing previously unparsed portions of the SIP message header and SIP content), and the like, as well as various combinations thereof. Although not depicted, prioritizing SIP network elements $510_2$-$510_N$ may include modules similar to parsing module 512, a prioritizing module 514, and a parsing and processing module 516 depicted and described herein with respect to SIP prioritizing network element $510_1$.

The parsing module 512 receives incoming SIP messages (either non-prioritized or prioritized) from network elements $502_1$. The parsing module 512 parses incoming SIP messages to obtain SIP message prioritization information for use in prioritizing the incoming SIP messages (i.e., information for use in determining respective message priority levels for the SIP messages and assigning the determined message priority levels to the SIP messages). The prioritizing module 514 prioritizes SIP messages using SIP message prioritization policy 530 received from management system 540 and SIP message prioritization information received from parsing module 512. As depicted in FIG. 5, prioritizing module 514 may discard/reject a portion of the SIP messages (e.g., in response to detected load conditions and based on assigned message priority levels, SIP message prioritization policy 530, and the like, as well as various combinations thereof). The prioritizing module 514 passes the remaining prioritized SIP message to parsing and processing module 516.

As depicted in FIG. 5, parsing and processing module 516 parses the prioritized SIP messages (e.g., parses portions of each prioritized SIP message not parsed by parsing module 512). The parsing and processing module 516 processes the prioritized SIP messages. In one embodiment, parsing and processing module 516 processes prioritized SIP messages according to the respective assigned message priority levels. Although not depicted, in one embodiment, parsing and/or processing of SIP messages may be performed according to SIP message prioritization policy 530. The processed SIP messages are transmitted from prioritizing SIP network element 510 to network elements 520). In one embodiment, processed SIP messages are transmitted from prioritizing SIP network element 510 to network elements 520 in a manner for propagating respective assigned message priority levels of the SIP messages.

As depicted in FIG. 5, and described herein, SIP message prioritization policies 530 may be updated. In one embodiment, SIP message prioritization policies 530 may be updated by management system 540. In one embodiment, SIP message prioritization policies 530 may be updated by prioritizing SIP network elements 510 (e.g., by prioritizing SIP network elements 510 to which the SIP message prioritization policies 530 are distributed, respectively). In one embodiment, prioritizing SIP network elements 510 may update the SIP message prioritization policies 530 either locally on prioritizing SIP networks 510, respectively, or remotely on management system 140 (i.e., by transmitting SIP message prioritization feedback information to management system 140). In one embodiment, SIP message prioritization policies 530 may be updated by various other network elements (e.g., network elements 502, network elements 520, and the like), various other management systems (not depicted), and the like, as well as various combinations thereof.

In one embodiment, SIP message prioritization policies 530 may be updated using information from parsing and processing modules 516 of respective prioritizing SIP network elements 510 to which the SIP message prioritization policies 530 are distributed, respectively. In such embodiments, information provided by parsing and processing modules 516 may include at least one of information obtained from SIP message parsing, results of SIP message processing, and the like, as well as various combinations thereof. For example, in one embodiment, such information may include changes in at least one of traffic volume, volumes of different message types, Volumes of messages from/to specific source/destination addresses, average message sizes, and the like, as well as various combinations thereof.

In one embodiment, one or more of SIP message prioritization policies 530 may be updated in response to various information, conditions, and the like, as well as various combinations thereof. In one embodiment, a SIP message prioritization policy may be updated in response to an event known, expected, or predicted to result in changes to traffic volumes (e.g., to support increased network traffic resulting from a television program, a webcast event, and the like, as well as various combinations thereof. In one embodiment, a SIP message prioritization policy may be updated in response to availability of a new service. In one embodiment, the SIP message prioritization policy may be updated in response to addition of a customer, deletion of a customer, changes in customer size, and the like, as well as various combinations thereof.

In one embodiment, a SIP message prioritization policy may be updated in response to actual traffic conditions detected within the network. For example, various planned and unplanned events may result in significant increases in traffic to particular websites, significant increases in emergency traffic, and the like, as well as various other increases and decreases in traffic to specific addresses, increases and decreases in specific types of traffic, and the like, as well as various combinations thereof. In one embodiment, such dynamic traffic changes may be reported from the network (e.g., reported and/or retrieved from SIP network elements, routers, traffic monitoring devices, and the like, as well as various combinations thereof) for use by a management system to dynamically update SIP message prioritization policies which may then be distributed to the network for use in reacting to such dynamic traffic changes. In one embodiment, such dynamic traffic changes may be reported directly to a prioritization policy management system (illustratively, management system 540), to a traffic load monitoring system in communication with a prioritization policy management system, and the like, as well as various combinations thereof.

Figure 6:
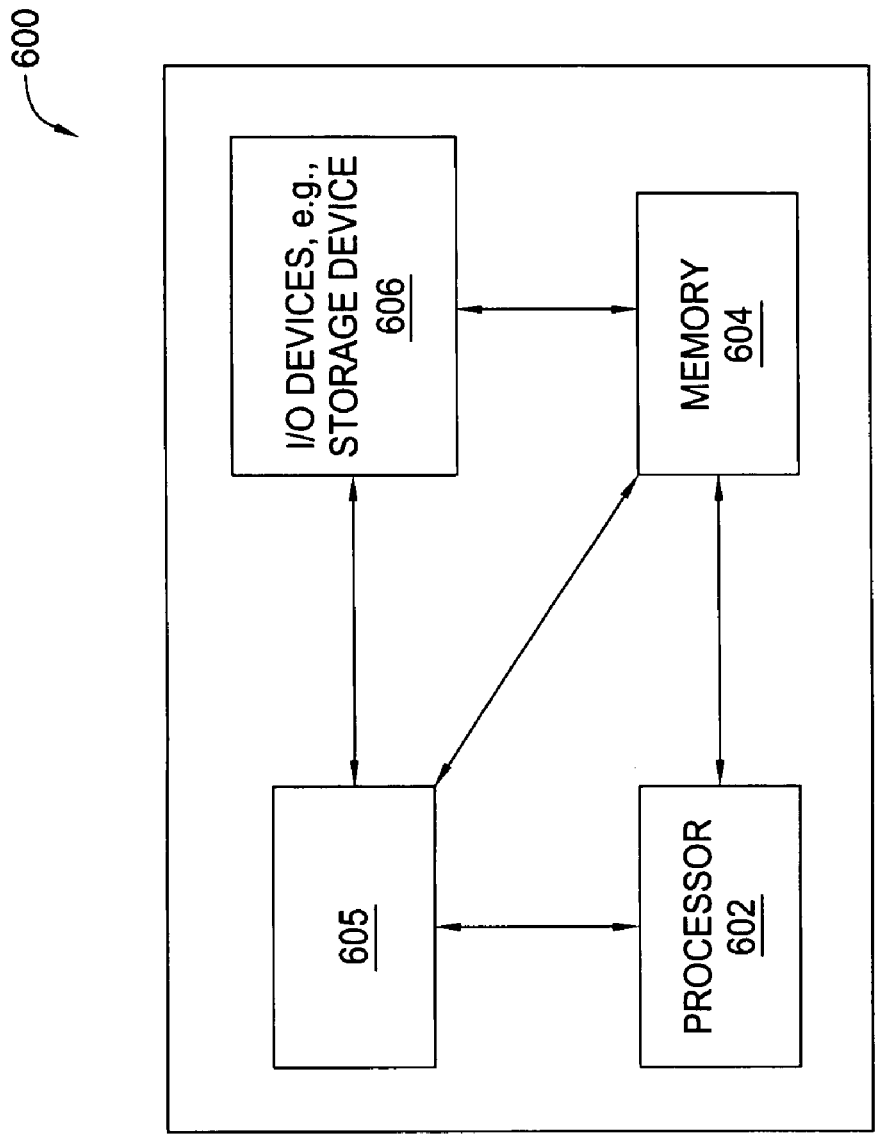
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, system 600 comprises a processor element 602 (e.g., a CPU), a memory 604, e.g., random access memory (RAM) and/or read only memory (ROM), a SIP message prioritization module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present SIP message prioritization module or process 605 can be loaded into memory 604 and executed by processor 602 to implement the functions as discussed above. As such, SIP message prioritization process 605 (including associated data structures) of the present invention can be stored on a computer readable medium or carrier, e.g., RAM memory, magnetic or optical drive or diskette and the like.

Although primarily depicted and described herein with respect to SIP message prioritization, in one embodiment, the present invention may support prioritization of other non-SIP message types (e.g., HTTP messages). In such embodiments, prioritization of other message types may include prioritization of other message types within a network element for controlling processing of messages within a network element, prioritization of other messages over at least a portion of an end-to-end communication path, and the like, as well as various combinations thereof. Although primarily depicted and described herein with respect to message prioritization, in one embodiment, the present invention may be adapted for supporting prioritization for various other forms of information.

Although primarily depicted and described herein with respect to a generic SIP-based communication network, in one embodiment, at least a portion of service provider domain 101 operates as an IP Multimedia Subsystem (IMS) network architecture as standardized by Third Generation Partnership Project (3GPP) and Third Generation Partnership Project Two (3GPP2). In the IMS network architecture, SIP signaling (control) and associated media sessions (data) are separated such that SIP signaling is used to support services such as voice-over-IP sessions, multimedia sessions, presence, instant messaging, and the like. Although primarily depicted and described herein with respect to supporting signaling between generic SIP network elements, SIP may be used to support signaling between IMS-specific network elements, such as call session control functions (e.g., proxy call session control functions (P-CSCFs), interrogating call session control functions (I-CSCFs), serving call session control functions (S-CSCFs), and the like, as well as various combinations thereof).

Although various embodiments which incorporate the teachings of the present invention have been shown and described in detail herein, those skilled in the art can readily devise many other varied embodiments that still incorporate these teachings.

What is claimed is:

1. A method for handling a SIP message at a network node, comprising:

determining a message priority level for the SIP message; and propagating the SIP message from the network node based on the message priority level of the SIP message, wherein propagating the SIP message from the network node based on the message priority level comprises:

selecting one of a plurality of output ports of the network node based on the message priority level; and propagating the SIP message from the network node using the selected output port.

2. A method for handling a SIP message at a network node, comprising:

determining a message priority level for the SIP message; and propagating the SIP message from the network node based on the message priority level of the SIP message, wherein propagating the SIP message from the network node based on the message priority level comprises:

selecting one of a plurality of output networks available from the network node based on the message priority level; and propagating the SIP message from the network node toward the selected output network.

3. The method of claim 2, wherein the output networks comprise IP networks supporting different quality-of-service levels.

4. A method for handling a SIP message at a network node, comprising:

determining a message priority level for the SIP message; and propagating the SIP message from the network node based on the message priority level of the SIP message, wherein propagating the SIP message from the network node based on the message priority level comprises:

selecting one of a plurality of input ports associated with at least one network element based on the message priority level; and propagating the SIP message from the network element toward the selected input port.

5. The method of claim 4, wherein the plurality of input ports are associated with at least two network elements.

6. An apparatus for handling a SIP message at a network node, comprising:
   means for determining a message priority level for the SIP message; and
   means for propagating the SIP message from the network node based on the message priority level of the SIP message, wherein the means for propagating the SIP message from the network node based on the message priority level comprises:
      means for selecting one of a plurality of output ports of the network node based on the message priority level; and
      means for propagating the SIP message from the network node using the selected output port.

7. An apparatus for handling a SIP message at a network node, comprising:
   means for determining a message priority level for the SIP message; and
   means for propagating the SIP message from the network node based on the message priority level of the SIP message, wherein the means for propagating the SIP message from the network node based on the message priority level comprises:
      means for selecting one of a plurality of output networks available from the network node based on the message priority level; and
      means for propagating the SIP message from the network node toward the selected output network.

8. The apparatus of claim 7, wherein the output networks comprise IP networks supporting different quality-of-service levels.

9. An apparatus for handling a SIP message at a network node, comprising:
   means for determining a message priority level for the SIP message; and
   means for propagating the SIP message from the network node based on the message priority level of the SIP message, wherein the means for propagating the SIP message from the network node based on the message priority level comprises:
      means for selecting one of a plurality of input ports associated with at least one network element based on the message priority level; and
      means for propagating the SIP message from the network element toward the selected input port.

10. The apparatus of claim 9, wherein the plurality of input ports are associated with at least two network elements.

* * * * *